(12) United States Patent
Kastner et al.

(10) Patent No.: US 9,452,755 B2
(45) Date of Patent: Sep. 27, 2016

(54) VEHICLE TRAVEL CONTROL APPARATUS

(71) Applicant: HONDA MOTOR CO., LTD., Minato-Ku, Tokyo (JP)

(72) Inventors: Robert Kastner, Offenbah am Main (DE); Marcus Kleinehagenbrock, Offenbach am Main (DE); Morimichi Nishigaki, Offenbach am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/407,606

(22) PCT Filed: Nov. 7, 2012

(86) PCT No.: PCT/JP2012/078811
§ 371 (c)(1),
(2) Date: Dec. 12, 2014

(87) PCT Pub. No.: WO2014/006775
PCT Pub. Date: Jan. 9, 2014

(65) Prior Publication Data
US 2015/0142292 A1 May 21, 2015

(30) Foreign Application Priority Data
Jul. 6, 2012 (JP) ................. 2012-152701

(51) Int. Cl.
*B60T 7/12* (2006.01)
*G05D 1/00* (2006.01)
(Continued)

(52) U.S. Cl.
CPC ............... *B60W 30/143* (2013.01); *B60T 7/22* (2013.01); *B60T 8/32* (2013.01); *B60W 10/04* (2013.01); *B60W 10/18* (2013.01); *B60W 30/16* (2013.01); *B60W 40/04* (2013.01); *G05D 13/02* (2013.01); *B60K 2310/30* (2013.01);
(Continued)

(58) Field of Classification Search
USPC ......................... 701/96, 1, 301, 300, 70, 93
See application file for complete search history.

(56) References Cited

U.S. PATENT DOCUMENTS 5,600,557 A 2/1997 Ogawa
6,347,274 B2 2/2002 Kuramochi et al.
(Continued)

FOREIGN PATENT DOCUMENTS

JP H07-54944 A 2/1995
JP H08-318765 A 12/1996
(Continued)

*Primary Examiner* — Ronnie Mancho
(74) *Attorney, Agent, or Firm* — Carrier Blackman & Associates, P.C.; William D. Blackman; Jeffrey T. Gedeon

(57) ABSTRACT

A vehicle travel control apparatus includes a utility function determination unit, which determines a utility function fu representing a relationship between the manipulated variable for vehicle speed control of an own vehicle and an effectiveness degree, a travel inhibition degree function determination unit, which determines a travel inhibition degree function fr representing a relationship between the manipulated variable for vehicle speed control and an estimated travel inhibition degree of the own vehicle, and an appropriateness function determination unit, which determines an appropriateness function fap combining both functions fu and fr. A driving/braking force of the own vehicle is manipulated according to the value of the manipulated variable for vehicle speed control corresponding to a highest appropriateness in the appropriateness function fap.

22 Claims, 9 Drawing Sheets

(51) Int. Cl.
*G06F 7/00* (2006.01)
*G06F 17/00* (2006.01)
*B60W 30/14* (2006.01)
*B60W 10/04* (2006.01)
*B60W 30/16* (2012.01)
*B60T 8/32* (2006.01)
*B60W 40/04* (2006.01)
*B60W 10/18* (2012.01)
*G05D 13/02* (2006.01)
*B60T 7/22* (2006.01)
*B60W 10/184* (2012.01)
*B60W 50/00* (2006.01)

(52) U.S. Cl.
CPC ........ *B60T 2210/32* (2013.01); *B60W 10/184* (2013.01); *B60W 2050/0095* (2013.01); *B60W 2520/10* (2013.01); *B60W 2550/10* (2013.01); *B60W 2550/302* (2013.01); *B60W 2550/308* (2013.01)

(56) References Cited

U.S. PATENT DOCUMENTS

| | | | |
|---|---|---|---|
| 6,397,140 B2 | 5/2002 | Minowa et al. | |
| 6,708,085 B2 | 3/2004 | Yamane et al. | |
| 7,389,172 B2* | 6/2008 | Sugano | B60K 31/0008 701/301 |
| 7,650,217 B2* | 1/2010 | Ueyama | B60W 30/16 342/70 |
| 7,698,032 B2* | 4/2010 | Matsumoto | B60T 8/17557 180/170 |
| 8,078,383 B2* | 12/2011 | Isaji | B60W 10/184 340/425.5 |
| 8,615,357 B2* | 12/2013 | Simon | B60W 30/16 340/435 |
| 8,965,677 B2* | 2/2015 | Breed | B60W 30/04 701/301 |
| 9,008,940 B2* | 4/2015 | Ueyama | B60W 30/095 340/435 |
| 2006/0095195 A1 | 5/2006 | Nishimura et al. | |
| 2015/0104757 A1* | 4/2015 | Moncrief | G09B 9/05 434/38 |

FOREIGN PATENT DOCUMENTS

| | | |
|---|---|---|
| JP | 2001-243600 A | 9/2001 |
| JP | 2002-123894 A | 4/2002 |
| JP | 2006-131055 A | 5/2006 |
| JP | 2008-201149 A | 9/2008 |
| JP | 2009-051356 A | 3/2009 |
| JP | 2010-083402 A | 4/2010 |

* cited by examiner

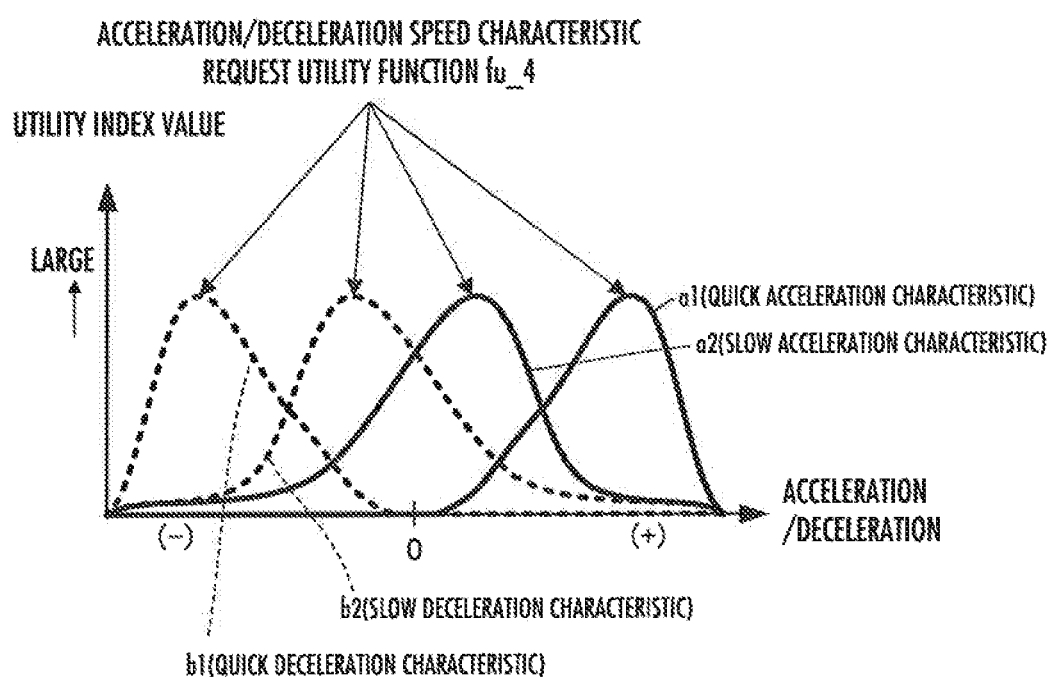

VEHICLE TRAVEL CONTROL APPARATUS

TECHNICAL FIELD

The present invention relates to a travel control apparatus that controls the vehicle speed of a vehicle.

BACKGROUND ART

There has conventionally and generally been known a technique whereby to control the vehicle speed of a vehicle set by a driver or the like to a fixed target vehicle speed or to control the vehicle speed of a vehicle so as to maintain the vehicle-to-vehicle distance between an own vehicle and a preceding vehicle at a set target vehicle-to-vehicle distance.

Further, as described in, for example, Patent Document 1, there has conventionally been known a technique in which the vehicle speed of a vehicle is controlled to attain a target acceleration/deceleration speed requested by a driver in a travel environment determined to be safe, while the target acceleration/deceleration speed is forcibly changed to give a higher priority to safety in a travel environment determined to be dangerous.

CITATION LIST

Patent Literature

Patent Literature 1: Japanese Patent Application Laid-Open No. 8-318765

SUMMARY OF INVENTION

Technical Problem

According to the conventional technique as described in Patent Literature 1, a situation in which the vehicle speed of a vehicle is forcibly controlled to a vehicle speed not intended by a driver may frequently occur, depending on a driving habit or the like of the driver, and may cause discomfort to the driver.

Further, the conventional technique whereby to control the vehicle speed so as to attain a target vehicle-to-vehicle distance usually takes only a preceding vehicle in front of an own vehicle into account. Hence, in a situation wherein another vehicle cuts in between the own vehicle and the preceding vehicle, the vehicle speed of the own vehicle inconveniently tends to change.

The present invention has been made in view of the background described above, and an object of the invention is to provide a travel control apparatus capable of controlling the vehicle speed of an own vehicle so as to achieve in a well-balanced manner both maximum satisfaction of a request related to the vehicle speed of the own vehicle or the vehicle-to-vehicle distance between the own vehicle and a preceding vehicle and prevention of the travel of the own vehicle from being inhibited by other vehicles or the like in the surroundings of the own vehicle.

Solution to Problem

To this end, a vehicle travel control apparatus in accordance with the present invention is a travel control apparatus having a vehicle speed control unit which controls a vehicle speed of an own vehicle on the basis of a target vehicle speed of the own vehicle set beforehand, including:

a vehicle speed detection unit which detects an actual vehicle speed of the own vehicle;

an external situation recognition unit which recognizes an external situation in the surroundings of the own vehicle;

a utility function determination unit which determines a utility function, which represents a relationship between a manipulated variable for vehicle speed control, which is a manipulated variable for controlling the vehicle speed of the own vehicle, and a utility index value, which is an index value representing an effectiveness degree of controlling the vehicle speed of the own vehicle according to each value of the manipulated variable for vehicle speed control, according to at least the target vehicle speed and the detected vehicle speed of the own vehicle;

a travel inhibition degree function determination unit which determines a travel inhibition degree function, which represents a relationship between the manipulated variable for vehicle speed control and a travel inhibition degree index value, which is an index value representing an inhibition degree of the travel of the own vehicle estimated in the case where the vehicle speed of the own vehicle is controlled on the basis of each value of the manipulated variable for vehicle speed control, according to the recognized external situation; and an appropriateness function determination unit which determines an appropriateness function, which represents a relationship between the manipulated variable for vehicle speed control and the appropriateness of each value of the manipulated variable for vehicle speed control, by combining the determined utility function and the determined travel inhibition degree function, wherein the vehicle speed control unit is configured to control the vehicle speed of the own vehicle by manipulating a driving/braking force of the own vehicle according to the value of the manipulated variable for vehicle speed control corresponding to a highest appropriateness in the determined appropriateness function (a first aspect of the invention).

Supplementarily, in the present invention, determining a "function" means to determine a set of a plurality of types of values of the manipulated variables for vehicle speed control serving as independent variables of the function and function values (the utility index value, the travel inhibition degree index value and the like) corresponding thereto, or to determine a parameter that defines the function (a parameter that makes it possible to uniquely identify a function value corresponding to an arbitrary value of the manipulated variable for vehicle speed control). The same applies not only to the first aspect of the invention but also to a second aspect to a fifteenth aspect of the invention, which will be discussed hereinafter.

In the case where the set of the values of a plurality of types of the manipulated variables for vehicle speed control and the function values corresponding thereto are determined, the function value corresponding to an arbitrary value of the manipulated variable for vehicle speed control can be determined by complement processing, such as linear interpolation.

According to the first aspect of the invention, the utility function determined by the utility function determination unit and the travel inhibition degree function determined by the travel inhibition degree function determination unit are combined by the appropriateness function determination unit thereby to determine the appropriateness function.

In this case, the function value of the utility function (the utility index value) corresponding to an arbitrary value of the manipulated variable for vehicle speed control is an index value that indicates the degree of effectiveness for satisfying a request (a request related to the vehicle speed control of the own vehicle) that includes at least the target vehicle speed if it is assumed that the vehicle speed control of the own vehicle is carried out on the basis of the value of the manipulated variable for vehicle speed control.

Further, the function value of the travel inhibition degree function (the index value of the travel inhibition degree) corresponding to an arbitrary value of the manipulated variable for vehicle speed control is an index value that indicates how much the travel of the own vehicle may be inhibited according to an external situation in the surroundings of the own vehicle if it is assumed that the vehicle speed control of the own vehicle is carried out on the basis of the value of the manipulated variable for vehicle speed control.

Therefore, the appropriateness function obtained by combining the utility function and the travel inhibition degree function will indicate how appropriate the function value of the appropriateness function (the appropriateness) corresponding to an arbitrary value of the manipulated variable for vehicle speed control will be in both satisfying a request that includes at least the target vehicle speed and preventing the travel of the own vehicle from being inhibited according to an external situation in the surroundings of the own vehicle if it is assumed that the vehicle speed control of the own vehicle is carried out on the basis of the value of the manipulated variable for vehicle speed control.

The vehicle speed control unit therefore manipulates the driving/braking force of the own vehicle on the basis of the manipulated variable for vehicle speed control corresponding to a highest appropriateness among the determined appropriateness functions, thereby controlling the vehicle speed of the own vehicle.

Thus, according to the first aspect of the invention, the vehicle speed of the own vehicle can be controlled so as to achieve in a well-balanced manner maximum satisfaction of a request including at least a target vehicle speed and prevention of the travel of the own vehicle from being inhibited according to the external situation in the surroundings of the own vehicle.

The first aspect of the invention may further include a vehicle-to-vehicle distance detection unit that detects the vehicle-to-vehicle distance between the own vehicle and a preceding vehicle in front of the own vehicle, and the vehicle speed control unit may have a function for controlling the vehicle speed of the own vehicle on the basis of the target vehicle speed and a target vehicle-to-vehicle distance, which is the target value of the vehicle-to-vehicle distance set beforehand.

Further, in this case, the utility function determination unit is preferably configured to carry out a first processing for determining a first sub utility function, which represents a relationship between the manipulated variable for vehicle speed control and the utility index value according to the target vehicle speed and the detected vehicle speed of the own vehicle, and a second processing for determining a second sub utility function, which represents a relationship between the manipulated variable for vehicle speed control and the utility index value, according to the target vehicle-to-vehicle distance and the detected vehicle-to-vehicle distance, and to combine at least the first sub utility function and the second sub utility function so as to determine the utility function (a second aspect of the invention).

According to the second aspect of the invention, the utility function determined by the utility function determination unit is a function obtained by combining at least the first sub utility function and the second sub utility function.

In this case, the first sub utility function is a function providing an index value that indicates the degree of effectiveness of a function value (utility index value), which corresponds to an arbitrary value of the manipulated variable for vehicle speed control, in attaining the target vehicle speed if it is assumed that the vehicle speed control of the own vehicle is carried out on the basis of the value of the manipulated variable for vehicle speed control.

Further, the second sub utility function is a function providing an index value that indicates the degree of effectiveness of a function value (utility index value), which corresponds to an arbitrary value of the manipulated variable for vehicle speed control, in attaining the target vehicle-to-vehicle distance if it is assumed that the vehicle speed control of the own vehicle is carried out on the basis of the value of the manipulated variable for vehicle speed control.

Hence, the utility function obtained by combining the first sub utility function and the second sub utility function will be the function providing an index value that indicates the degree of effectiveness of the function value (utility index value), which corresponds to an arbitrary value of the manipulated variable for vehicle speed control, in satisfying the request that includes at least a target vehicle-to-vehicle distance in addition to the target vehicle speed if it is assumed that the vehicle speed control of the own vehicle is carried out on the basis of the value of the manipulated variable for vehicle speed control.

Thus, according to the second aspect of the invention, the vehicle speed of the own vehicle can be controlled so as to achieve in a well-balanced manner both maximum satisfaction of a request including at least a target vehicle-to-vehicle distance in addition to a target vehicle speed and prevention of the travel of the own vehicle from being inhibited according to the external situation in the surroundings of the own vehicle.

In the first aspect of the invention, the vehicle speed control unit may have a function of controlling the vehicle speed of the own vehicle on the basis of two or more target parameters from among the target vehicle speed, a target travel mode which is variably determined beforehand to specify an acceleration operation pattern of the own vehicle, and a target acceleration/deceleration speed characteristic variably determined beforehand to specify the speed level of the acceleration or the deceleration of the own vehicle in the case where the recognized external situation is a predetermined external situation, the two or more target parameters including at least the target vehicle speed.

And in this case, the utility function determination unit is preferably configured to carry out two or more processings from among a first processing for determining a first sub utility function which indicates a relationship between the manipulated variable for vehicle speed control and the utility index value on the basis of the target vehicle speed and the detected vehicle speed of the own vehicle, a third processing for determining a third sub utility function which indicates a relationship between the manipulated variable for vehicle speed control and the utility index value on the basis of the target travel mode, and a fourth processing for determining a fourth sub utility function which indicates a relationship between the manipulated variable for vehicle speed control and the utility index value on the basis of the target acceleration/deceleration speed characteristic in the case where the recognized external situation is the predetermined external situation, the two or more processings including at least the first processing, and to combine two or more sub utility functions determined by the two or more processings from among the first sub utility function, the third sub utility function and the fourth sub utility function so as to determine the utility function (a third aspect of the invention).

Further, in the second aspect of the invention, the vehicle speed control unit may have a function for controlling the vehicle speed of the own vehicle on the basis of three or more target parameters from among the target vehicle speed, the target vehicle-to-vehicle distance, a target travel mode variably determined beforehand to specify an acceleration operation pattern of the own vehicle, and a target acceleration/deceleration speed characteristic variably determined beforehand to specify the speed level of the acceleration or the deceleration of the own vehicle in the case where the recognized external situation is a predetermined external situation, the three or more target parameters including at least the target vehicle speed and the target vehicle-to-vehicle distance.

And in this case, the utility function determination unit is preferably configured to carry out three or more processings from among a first processing for determining a first sub utility function which indicates a relationship between the manipulated variable for vehicle speed control and the utility index value on the basis of the target vehicle speed and the detected vehicle speed of the own vehicle, a second processing for determining a second sub utility function which indicates a relationship between the manipulated variable for vehicle speed control and the utility index value on the basis of the target vehicle-to-vehicle distance and the detected vehicle-to-vehicle distance, a third processing for determining a third sub utility function which indicates a relationship between the manipulated variable for vehicle speed control and the utility index value on the basis of the target travel mode, and a fourth processing for determining a fourth sub utility function which indicates a relationship between the manipulated variable for vehicle speed control and the utility index value on the basis of the target acceleration/deceleration speed characteristic in the case where the recognized external situation is the predetermined external situation, the three or more processings including at least the first processing and the second processing, and to combine three or more sub utility functions determined by the three or more processings among the first sub utility function, the second sub utility function, the third sub utility function and the fourth sub utility function so as to determine the utility function (a fourth aspect of the invention).

According to the third aspect of the invention, the utility function determined by the utility function determination unit is a function obtained by combining two or more sub utility functions from among the first sub utility function, the third sub utility function, and the fourth sub utility function, the two or more sub utility functions including at least the first sub utility function.

The first sub utility function is the same function as that described in relation to the second aspect of the invention.

Further, the third sub utility function is a function providing an index value that indicates the degree of effectiveness of a function value (utility index value), which corresponds to an arbitrary value of the manipulated variable for vehicle speed control, in attaining the target travel mode acceleration operation pattern in the case where it is assumed that the vehicle speed control of the own vehicle is carried out on the basis of the value of the manipulated variable for vehicle speed control.

Further, the fourth sub utility function is a function providing an index value that indicates the degree of effectiveness of a function value (utility index value), which corresponds to an arbitrary value of the manipulated variable for vehicle speed control, in attaining the target acceleration/deceleration speed characteristic if it is assumed that the vehicle speed control of the own vehicle is carried out on the basis of the value of the manipulated variable for vehicle speed control in the predetermined external situation.

Hence, the utility function obtained by combining two or more sub utility functions from among the first sub utility function, the third sub utility function, and the fourth sub utility function, including at least the first sub utility function, is a function that provides an index value indicating the degree of effectiveness of the function value (utility index value), which corresponds to an arbitrary value of the manipulated variable for vehicle speed control, in satisfying the request that includes at least one or both of a target travel mode and a target acceleration/deceleration speed characteristic in addition to the target vehicle speed if it is assumed that the vehicle speed control of the own vehicle is carried out on the basis of the value of the manipulated variable for vehicle speed control.

Thus, according to the third aspect of the invention, the vehicle speed of the own vehicle can be controlled so as to achieve in a well-balanced manner both maximum satisfaction of a request including at least one or both of a target travel mode and a target acceleration/deceleration speed characteristic in addition to a target vehicle speed and the prevention of the travel of the own vehicle from being inhibited according to the external situation in the surroundings of the own vehicle.

Further, according to the fourth aspect of the invention, the utility function determined by the utility function determination unit is a function obtained by combining three or more sub utility functions from among the first sub utility function, the second sub utility function, the third sub utility function, and the fourth sub utility function, including at least the first sub utility function and the second sub utility function.

The first sub utility function and the second sub utility function are the same functions as those described in relation to the second aspect of the invention.

Further, the third sub utility function and the fourth sub utility function are the same functions as described in relation to the third aspect of the invention.

Hence, the utility function obtained by combining three or more sub utility functions from among the first sub utility function, the second sub utility function, the third sub utility function, and the fourth sub utility function, including at least the first sub utility function and the second sub utility function, is a function providing an index value that indicates the degree of effectiveness of a function value (utility index value), which corresponds to an arbitrary value of the manipulated variable for vehicle speed control, in satisfying the request including one or both of a target travel mode and a target acceleration/deceleration speed characteristic in addition to the target vehicle speed and the target vehicle-to-vehicle distance if it is assumed that the vehicle speed control of the own vehicle is carried out on the basis of the value of the manipulated variable for vehicle speed control.

According to the fourth aspect of the invention, the vehicle speed of the own vehicle can be controlled so as to achieve in a well-balanced manner both maximum satisfaction of the requests, including a target vehicle speed and a target vehicle-to-vehicle distance and one or both of a target travel mode and a target acceleration/deceleration speed characteristic, and the prevention of the travel of the own vehicle from being inhibited according to the external situation in the surroundings of the own vehicle.

Incidentally, the present invention can be applies to a case where a target vehicle-to-vehicle distance is set while a target vehicle speed is not set.

Specifically, a vehicle travel control apparatus according to another mode of the present invention is a travel control apparatus having a vehicle speed control unit which controls a vehicle speed of an own vehicle on the basis of a target vehicle-to-vehicle distance set beforehand between the own vehicle and a preceding vehicle in front thereof, including:

a vehicle-to-vehicle distance detection unit which detects a vehicle-to-vehicle distance between the own vehicle and the preceding vehicle in front thereof;

an external situation recognition unit which recognizes an external situation in the surroundings of the own vehicle;

a utility function determination unit which determines a utility function, which represents the relationship between a manipulated variable for vehicle speed control, which is a manipulated variable for controlling the vehicle speed of the own vehicle, and a utility index value, which is an index value representing an effectiveness degree of controlling the vehicle speed of the own vehicle according to each value of the manipulated variable for vehicle speed control, at least according to the target vehicle-to-vehicle distance and the detected vehicle-to-vehicle distance;

a travel inhibition degree function determination unit which determines a travel inhibition degree function, which represents a relationship between the manipulated variable for vehicle speed control and a travel inhibition degree index value, which is an index value representing an inhibition degree of the travel of the own vehicle estimated in the case where the vehicle speed of the own vehicle is controlled according to each value of the manipulated variable for vehicle speed control, according to the recognized external situation; and an appropriateness function determination unit which determines an appropriateness function, which represents a relationship between the manipulated variable for vehicle speed control and an appropriateness of each value of the manipulated variable for vehicle speed control, by combining the determined utility function and the determined travel inhibition degree function, wherein the vehicle speed control unit is configured to control the vehicle speed of the own vehicle by manipulating a driving/braking force of the own vehicle according to the value of the manipulated variable for vehicle speed control corresponding to a highest appropriateness in the determined appropriateness function (a fifth aspect of the invention).

According to the fifth aspect of the invention, the utility function determined by the utility function determination unit and a travel inhibition degree function determined by the travel inhibition degree function determination unit are combined by the appropriateness function determination unit so as to determine the appropriateness function.

In the fifth aspect of the invention, the function value of the utility function (utility index value) corresponding to an arbitrary value of the manipulated variable for vehicle speed control is an index value that indicates the degree of effectiveness in satisfying the requests (the requests related to the vehicle speed control of the own vehicle) including at least the target vehicle-to-vehicle distance if it is assumed that the vehicle speed control of the own vehicle is carried out on the basis of the value of the manipulated variable for the vehicle speed control.

Further, the function value of the travel inhibition degree function (the index value of the travel inhibition degree) corresponding to an arbitrary value of the manipulated variable for vehicle speed control is an index value that indicates how much the travel of the own vehicle may be inhibited on the basis of an external situation in the surroundings of the own vehicle in the case where it is assumed that the vehicle speed control of the own vehicle is carried out on the basis of the value of the manipulated variable for vehicle speed control.

Therefore, the appropriateness function obtained by combining the utility function and the travel inhibition degree function will indicate how appropriate the function value of the appropriateness function (the appropriateness) corresponding to an arbitrary value of the manipulated variable for vehicle speed control will be in both satisfying a request that includes at least the target vehicle-to-vehicle distance and also preventing the travel of the own vehicle from being inhibited according to an external situation in the surroundings of the own vehicle in the case where it is assumed that the vehicle speed control of the own vehicle is carried out on the basis of the value of the manipulated variable for vehicle speed control.

The vehicle speed control unit therefore manipulates the driving/braking force of the own vehicle on the basis of the manipulated variable for vehicle speed control corresponding to a highest appropriateness among the determined appropriateness functions, thereby controlling the vehicle speed of the own vehicle.

Thus, according to the fifth aspect of the invention, the vehicle speed of the own vehicle can be controlled so as to achieve in a well-balanced manner both maximum satisfaction of a request including at least a target vehicle-to-vehicle distance and prevention of the travel of the own vehicle from being inhibited according to the external situation in the surroundings of the own vehicle.

Further, in the fifth aspect of the invention, the vehicle speed control unit may have a function of controlling the vehicle speed of the own vehicle on the basis of two or more target parameters from among the target vehicle-to-vehicle distance, a target travel mode variably determined beforehand to specify an acceleration operation pattern of the own vehicle, and a target acceleration/deceleration speed characteristic variably determined beforehand to specify the speed level of the acceleration or the deceleration of the own vehicle in the case where the recognized external situation is a predetermined external situation, the two or more target parameters including at least the target vehicle-to-vehicle distance.

And in this case, the utility function determination unit is preferably configured to determine the utility function by executing two or more processings from among a second processing for determining a second sub utility function, which represents a relationship between the manipulated variable for vehicle speed control and the utility index value according to the target vehicle-to-vehicle distance and the detected vehicle-to-vehicle distance, a third processing for determining a third sub utility function, which represents a relationship between the manipulated variable for vehicle speed control and the utility index value according to the target travel mode, and a fourth processing for determining a fourth sub utility function, which represents a relationship between the manipulated variable for vehicle speed control and the utility index value according to the target acceleration/deceleration speed characteristic in the case where the recognized external situation is the predetermined external situation, the two or more processings including at least the second processing, and by combining two or more sub utility functions determined by the two or more processings from among the second sub utility function, the third sub utility function and the fourth sub utility function (a sixth aspect of the invention).

According to the sixth aspect of the invention, the utility function determined by the utility function determination unit is a function obtained by combining two or more sub utility functions from among the second sub utility function, the third sub utility function, and the fourth sub utility function, including at least the second sub utility function.

The second sub utility function is a function that will be an index value indicating the degree of effectiveness of the function value (utility index value), which corresponds to an arbitrary value of the manipulated variable for vehicle speed control, in attaining the target vehicle-to-vehicle distance in the case where the vehicle speed control of the own vehicle is carried out on the basis of the value of the manipulated variable for vehicle speed control.

Further, the third sub utility function is a function that will be an index value indicating the degree of effectiveness of the function value (utility index value), which corresponds to an arbitrary value of the manipulated variable for vehicle speed control, in accomplishing the target travel mode acceleration operation pattern in the case where it is assumed that the vehicle speed control of the own vehicle is carried out on the basis of the value of the manipulated variable for vehicle speed control.

Further, the fourth sub utility function is a function that will be an index value indicating the degree of effectiveness of the function value (utility index value), which corresponds to an arbitrary value of the manipulated variable for vehicle speed control, in accomplishing the target acceleration/deceleration speed characteristic in the case where it is assumed that the vehicle speed control of the own vehicle is carried out on the basis of the value of the manipulated variable for vehicle speed control in the predetermined external situation.

Therefore, the utility function obtained by combining two or more sub utility functions from among the second sub utility function, the third sub utility function, and the fourth sub utility function, including at least the second sub utility function, is a function that will be an index value indicating the degree of effectiveness of a function value (utility index value), which corresponds to an arbitrary value of the manipulated variable for vehicle speed control, in satisfying requests, including at least one or both of a target travel mode and a target acceleration/deceleration speed characteristic, in addition to the target vehicle-to-vehicle distance in the case where it is assumed that the vehicle speed control of the own vehicle is carried out on the basis of the value of the manipulated variable for vehicle speed control.

Thus, according to the sixth aspect of the invention, the vehicle speed of the own vehicle can be controlled so as to achieve in a well-balanced manner both maximum satisfaction of requests including at least one or both of a target travel mode and a target acceleration/deceleration speed characteristic, in addition to a target vehicle-to-vehicle distance and prevention of the travel of the own vehicle from being inhibited according to the external situation in the surroundings of the own vehicle.

In the third aspect of the invention, the fourth aspect of the invention or the sixth aspect of the invention, the predetermined external situation preferably includes at least a situation in which at least a preceding vehicle exists in front of the own vehicle (a seventh aspect of the invention).

According to the seventh aspect of the invention, in the situation in which a preceding vehicle is present in front of the own vehicle, it is possible to quickly accelerate or decelerate the own vehicle or slowly accelerate or decelerate the own vehicle according to the target acceleration/deceleration speed characteristic.

The "preceding vehicle" in the seventh aspect of the invention is not limited to another vehicle traveling in the same lane area as the own vehicle and may also include another vehicle that is about to cut in from a lane area beside the own vehicle or another vehicle that is highly likely to cut in immediately after the current time.

In the first to the seventh aspects of the invention described above, preferably, the external situation in the surroundings of the own vehicle recognized by the external situation recognition unit includes the state of existence of other vehicles in the surroundings of the own vehicle including at least a region in front of the own vehicle and a lateral region thereof, and the travel inhibition degree function determination unit is configured to, in the case where the existence of an other vehicle in the surroundings of the own vehicle has been recognized by the external situation recognition unit, determine a probability of the other vehicle expected to be traveling in front of the own vehicle in the future and to determine the travel inhibition degree function such that the travel inhibition degree index value corresponding to each value of the manipulated variable for vehicle speed control becomes larger as the determined probability becomes higher (an eighth aspect of the invention).

According to the eighth aspect of the invention, in the case where the existence of an other vehicle in the surroundings of the own vehicle has been recognized by the external situation recognition unit, the travel inhibition degree function is determined by reflecting the probability that the other vehicle is expected to be traveling in front of the own vehicle in the future.

In this case, the travel inhibition degree function is determined such that the function value of the travel inhibition degree function (the travel inhibition degree index value) corresponding to each value of the manipulated variable of vehicle speed control increases as the probability that the other vehicle is expected to be traveling in front of the own vehicle increases.

Therefore, the travel inhibition degree function can be determined, properly taking into account not only a situation in which another vehicle (a preceding vehicle) is traveling in front of the own vehicle but also the degree of possibility of the occurrence of a situation in which an other vehicle will alter the course thereof from a lane area adjacent to the lane area, in which the own vehicle is traveling, to the front of the own vehicle.

Thus, a travel inhibition degree function that highly matches an actual situation can be determined in a variety of situations in which other vehicles exist in the surroundings of the own vehicle.

As a result, the reliability of the appropriateness function can be enhanced. This consequently makes it possible to determine a highly reliable manipulated variable for vehicle speed control to control the vehicle speed of the own vehicle so as to accomplish maximum satisfaction of a request, such as a target vehicle speed, and prevention of the travel of the own vehicle from being inhibited by other vehicles.

In the eighth aspect of the invention, the travel inhibition degree function determination unit is preferably configured to, in the case where the existence of a plurality of other vehicles in the surroundings of the own vehicle has been recognized by the external situation recognition unit, determine the probability, determine a sub travel inhibition degree function that indicates the relationship between the manipulated variable for vehicle speed control and the index value of the travel inhibition degree attributable to the other vehicle on the basis of the probability for each of the other vehicles, and combine the sub travel inhibition degree functions determined for each of the plurality of the other vehicles thereby to determine the travel inhibition degree function (a ninth aspect of the invention).

According to the ninth aspect of the invention, in the case where a plurality of other vehicles is present around the own vehicle, the travel inhibition degree function is determined by combining the sub travel inhibition degree functions determined on the basis of the probability for each of the other vehicles.

Thus, the travel inhibition degree function can be determined by reflecting, in a comprehensive manner, the possibility that each of the plurality of other vehicles existing in the surroundings of the own vehicle will be traveling in front of the own vehicle in the future. As a result, the reliability of the travel inhibition degree function, i.e. the reliability of the appropriateness function can be further enhanced.

In the ninth aspect of the invention, more specifically, the travel inhibition degree function determination unit is preferably configured to determine, for each of the other vehicles, a reference sub travel inhibition degree function, which is the sub travel inhibition degree function applied in the case where the other vehicle is assumed to be traveling in front of the own vehicle in the future, and the probability, and to determine a function obtained by multiplying the reference sub travel inhibition degree function by the probability as the sub travel inhibition degree function (a tenth aspect of the invention).

According to the tenth aspect of the invention, the sub travel inhibition degree function can be determined such that the function value of the sub travel inhibition degree function for each of the other vehicles will be an appropriate value as an estimated value of the degree of inhibition of the travel of the own vehicle by the other vehicle.

In the eighth to the tenth aspects of the invention, the travel inhibition degree function determination unit preferably determines the probability on the basis of at least one relative relationship of the relative relationship between the own vehicle and the other vehicles and the relative relationship among other vehicles (an eleventh aspect of the invention).

The foregoing relative relationship is, for example, a relative position or a relative speed or the like.

According to the eleventh aspect of the invention, the probability that other vehicles are expected to travel in front of the own vehicle in the future can be determined with high reliability. As a result, the reliability of the travel inhibition degree function or the sub travel inhibition degree function can be enhanced.

In the first to the eleventh aspects of the invention, the external situation in the surroundings of the own vehicle recognized by the external situation recognition unit may include information related to at least one of the level of congestion, the visibility state, and the road surface condition in the surroundings of the own vehicle.

In this case, the appropriateness function determination unit is preferably configured to weight and combine the utility function and the travel inhibition degree function such that the dependence of the appropriateness function on the utility function and the dependence of the appropriateness function on the travel inhibition degree function differ from each other according to the information related to the congestion level or the visibility state or the road surface state in the surroundings of the own vehicle (a twelfth aspect of the invention).

The twelfth aspect of the invention makes it possible to make the dependence of the appropriateness function on the utility function and the dependence of the appropriateness function on the travel inhibition degree function different from each other according to the information related to the congestion level or the visibility state or the road surface condition in the surroundings of the own vehicle.

With this arrangement, if, for example, the congestion level or the visibility state or the road surface condition in the surroundings of the own vehicle is considered to indicate high necessity for preventing the travel of the own vehicle from being inhibited, then the dependence of the appropriateness function on the travel inhibition degree function can be set to be higher than the dependence thereof on the utility function.

As more specific modes for determining the appropriateness function as described in the twelfth aspect of the invention, the following mode may be adopted.

In the first to the twelfth aspects of the invention, the appropriateness function determination unit is preferably configured to, in the case where the external situation in the surroundings of the own vehicle recognized by the external situation recognition unit includes information indicating whether or not the surroundings of the own vehicle include an intersection, weight and combine the utility function and the travel inhibition degree function such that the dependence of the appropriateness function on the utility function becomes relatively low and the dependence of the appropriateness function on the travel inhibition degree function becomes relatively high in the case where the surroundings of the own vehicle include the intersection (a thirteenth aspect of the invention).

In other words, if the surroundings of the own vehicle include an intersection, then the congestion level of the surroundings of the own vehicle is usually high, so that the necessity for preventing the travel of the own vehicle from being inhibited is high. Hence, according to the thirteenth aspect of the invention, the appropriateness function determination unit weights and combines the utility function and the travel inhibition degree function as described above.

With this arrangement, the vehicle speed of the own vehicle can be controlled so as to permit maximized prevention of the travel of the own vehicle from being inhibited at an intersection.

Further, in the first to the thirteenth aspects of the invention, the appropriateness function determination unit is preferably configured to, in the case where the external situation in the surroundings of the own vehicle recognized by the external situation recognition unit includes information indicating whether or not the surroundings of the own vehicle include a nighttime environment or a rush hour time environment, weight and combine the utility function and the travel inhibition degree function such that the dependence of the appropriateness function on the utility function becomes relatively low and the dependence of the appropriateness function on the travel inhibition degree function becomes relatively high in the case where the surroundings of the own vehicle are the nighttime environment or the rush hour time environment (a fourteenth aspect of the invention).

In other words, if the surroundings of the own vehicle indicate the nighttime environment or the rush hour time environment, then usually, the visibility state in the surroundings of the own vehicle is poor or the congestion level is high. According to the fourteenth aspect of the invention, therefore, the appropriateness function determination unit weights and combines the utility function and the travel inhibition degree function as described above.

This arrangement allows the vehicle speed of the own vehicle to be controlled such that the prevention of the travel of the own vehicle from being inhibited can be maximized in the nighttime environment or the rush hour time environment.

Further, in the first to the fourteenth aspects of the invention, the appropriateness function determination unit is preferably configured to, in the case where the external situation in the surroundings of the own vehicle recognized by the external situation recognition unit includes information indicating whether or not the surroundings of the own vehicle are a rainfall environment or a snowfall environment, weight and combine the utility function and the travel inhibition degree function such that the dependence of the appropriateness function on the utility function becomes relatively low and the dependence of the appropriateness function on the travel inhibition degree function becomes relatively high in the case where the surroundings of the own vehicle are the rainfall environment or the snowfall environment (a fifteenth aspect of the invention).

In other words, if the surroundings of the own vehicle are the rainfall environment or the snowfall environment, then usually, the visibility state in the surroundings of the own vehicle is poor or a road surface is in a slippery state. According to the fifteenth aspect of the invention, therefore, the appropriateness function determination unit weights and combines the utility function and the travel inhibition degree function as described above.

This arrangement allows the vehicle speed of the own vehicle to be controlled such that the prevention of the inhibition of the travel of the own vehicle can be maximized in the rainfall environment or the snowfall environment.

In the first to the fifteenth aspects of the invention described above, the manipulated variable for vehicle speed control may be, for example, a target acceleration/deceleration of the own vehicle, a target vehicle speed (instantaneous target vehicle speed) or a target driving force and a target braking force of the own vehicle.

BRIEF DESCRIPTION OF DRAWINGS

FIG. 9 is a diagram for explaining the processing by a utility function determination unit in the second embodiment.

DESCRIPTION OF EMBODIMENTS

First Embodiment

Figure 1:
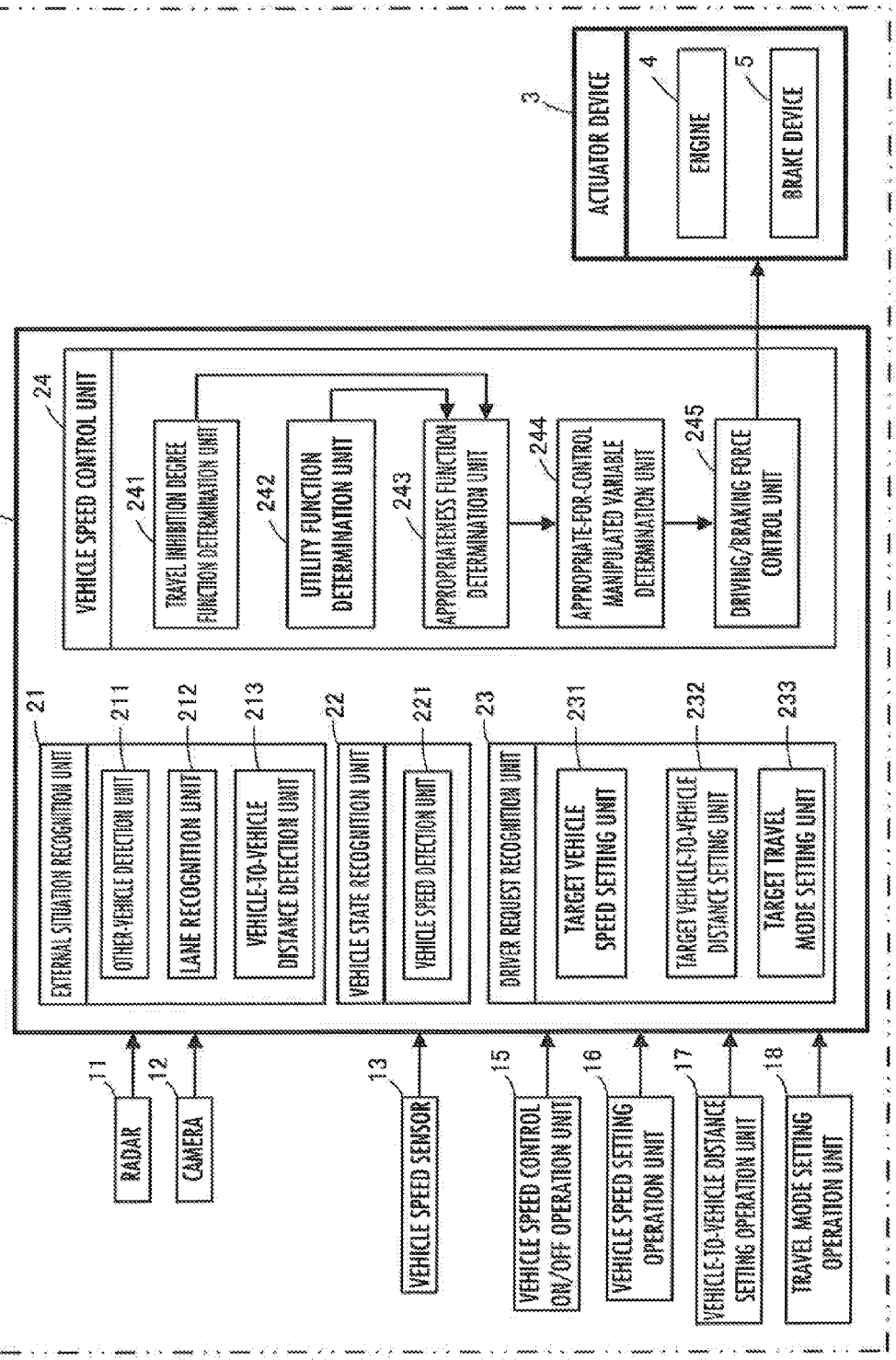
FIG. 1 is a block diagram illustrating a system configuration of an apparatus in a first embodiment of the present invention.

A first embodiment of the present invention will be described with reference to FIG. 1 to FIG. 7. Referring to FIG. 1, a vehicle 2 provided with a travel control apparatus 1 according to the present embodiment has an engine 4 and a brake device 5 as an actuator device 3 for driving or braking the wheels (not illustrated) for the travel thereof. In place of the engine 4 or in addition to the engine 4, an electric motor may be mounted.

The vehicle 2 (hereinafter referred to as the own vehicle 2 in some cases) is provided with a radar 11 and a camera 12 as the sensors for observing the situations around the own vehicle 2.

The radar 11 is a publicly known radar, such as an FM-CW radar or a laser radar. The radar 11 is mounted on the vehicle 2 so as to transmit a search signal (a radar radio wave or a laser beam) to a predetermined range on the front side of the vehicle 2 and to receive a reflected signal thereof. Then, based on the received reflected signal, the radar 11 generates a detection signal that indicates the distance of an object, such as another vehicle, which exists in an area in front of the own vehicle 2 (a transmission range of the search signal), from the own vehicle 2 and the speed of the object (a relative speed with respect to the own vehicle 2), and outputs the detection signal to the travel control apparatus 1.

The camera 12 is mounted on the vehicle 2 to image the predetermined range in an area in front of the vehicle 2. Further, the camera 12 outputs a video signal of a plurality of pixels, which constitutes a pickup image (a monotone image or a color image) in an area in front of the vehicle 2, to the travel control apparatus 1.

Further, the vehicle 2 is provided with a vehicle speed sensor 13, which outputs a detection signal based on the vehicle speed of the own vehicle 2 to the travel control apparatus 1, as a sensor for detecting the state of the own vehicle 2.

Further, operation units 15 to 18 for a driver to issue requests related to the travel of the own vehicle 2 to the travel control apparatus 1 are disposed in the interior of the vehicle 2.

Specifically, disposed in the vicinity of a driver's seat (e.g. a steering wheel) of the own vehicle 2 are a vehicle speed control ON/OFF operation unit 15 operated to instruct whether to carry out automatic control of the vehicle speed (hereinafter referred to as the vehicle speed control) of the own vehicle 2, a vehicle speed setting operation unit 16 operated to set a target vehicle speed of the own vehicle 2 when carrying out the vehicle speed control, a vehicle-to-vehicle distance setting operation unit 17 operated to set a target vehicle-to-vehicle distance between a preceding vehicle, which exists in front of the own vehicle 2, and the own vehicle 2 when carrying out the vehicle speed control, and a travel mode setting operation unit 18 operated to set a target travel mode of the own vehicle 2 when carrying out the vehicle speed control. These operation units 15 to 18 output operation signals indicating the information on operations by the driver to the travel control apparatus 1.

The travel control apparatus 1 is an electronic circuit unit constituted of a CPU, a RAM, a ROM, an interface circuit and the like. The travel control apparatus 1 does not have to be constituted of a single electronic circuit unit and may be constituted of a plurality of electronic circuit units capable of mutual communication.

The travel control apparatus 1 includes the following functional units having functions implemented by executing an installed program on the CPU (functions implemented by a software configuration) or functions implemented by a hardware configuration.

More specifically, the travel control apparatus 1 includes an external situation recognition unit 21 that recognizes a situation around the own vehicle 2 (external situation) by using signals received from the radar 11 and the camera 12, a vehicle state recognition unit 22 that recognizes the state of the own vehicle 2 on the basis of detection signals received from the vehicle speed sensor 13 and the like, a driver request recognition unit 23 that recognizes a driver request related to the travel of the own vehicle 2 on the basis of operation signals received from the operation units 15 to 18, and a vehicle speed control unit 24 that carries out control processing for controlling the vehicle speed of the own vehicle 2.

The external situation recognition unit 21 includes, as major functions thereof, an other-vehicle detection unit 211 that detects an other vehicle existing in front of the own vehicle 2, a lane recognition unit 212 that recognizes a lane region (lane) of a road surface ahead of the own vehicle 2, and a vehicle-to-vehicle distance detection unit 213 that detects the distance between the other vehicle existing ahead of the own vehicle 2 and the own vehicle 2 (vehicle-to-vehicle distance).

The vehicle-to-vehicle distance detection unit 213 also detects the relative vehicle speed of the other vehicle 2 with respect to the own vehicle 2 (relative speed).

Based on, for example, the characteristic of the shape or the like of the image of an object in a pickup image composed of a video signal of the camera 12, the other-vehicle detection unit 211 detects an other vehicle in the pickup image. The other vehicles to be detected by the other-vehicle detection unit 211 include a preceding vehicle which is traveling in front of the own vehicle 2 and in the same direction as that of the own vehicle 2 and also include other vehicles traveling in another lane area on the right or the left of a lane area in which the own vehicle 2 is traveling. Further, in the processing carried out by the other-vehicle detection unit 211, the direction of an other vehicle with respect to the own vehicle 2 (the azimuth angle with respect to the optical axis of the camera 12) is also detected on the basis of the position of the image of the other vehicle in the pickup image.

In order to enhance the reliability of the detection of other vehicles, the information on the distance or speed indicated by output signals of the radar 11 (the distance of an object, which is considered to be an other vehicle, from the own vehicle 2 or the relative vehicle speed thereof with respect to the own vehicle 2) may be used in addition to the pick up images of the camera 12. Further, if communication between the own vehicle 2 and an other vehicle is possible, then the information obtained by the communication may be used in addition to the pickup images of the camera 12.

The lane recognition unit 212 detects markers (markers that define a travel area of vehicles), such as white lines on a road surface in an area in front of the own vehicle 2, from the pickup images of the camera 12 thereby to recognize a lane area of the road surface in an area in front of the own vehicle 2 defined by the markers. The lane area to be recognized by the lane recognition unit 212 includes the lane area in which the own vehicle 2 is traveling and the lane area on the right side or the left side of the lane area.

If the vehicle 2 is provided with a navigation device or if the information on the road on which the own vehicle 2 is present can be acquired through the communication between the own vehicle 2 and an external server, then map information (the information on the road on which the own vehicle 2 is present) of the navigation device or the road information provided by the external server may be used, as necessary, in addition to the pickup images of the camera 12, to recognize a lane area.

If an other vehicle is detected by the other-vehicle detection unit 211, then the vehicle-to-vehicle distance detection unit 213 detects the vehicle-to-vehicle distance between the other vehicle and the own vehicle 2 on the basis of a detection signal of the radar 11. Further, the vehicle-to-vehicle distance detection unit 213 detects the relative vehicle speed of the other vehicle with respect to the own vehicle 2 on the basis of a detection signal of the radar 11 or a temporal change rate of the position of the other vehicle defined by the detected vehicle-to-vehicle distance and the detected direction of the other vehicle (the relative position with respect to the own vehicle 2).

If the vehicle 2 is provided with a stereo camera constituted of a plurality of cameras, then the vehicle-to-vehicle distance between an other vehicle and the own vehicle 2 may be detected by a stereo distance measurement technique. In this case, the radar 11 may be omitted.

Alternatively, in order to enhance the reliability of the detection of the vehicle-to-vehicle distance and the relative vehicle speed, the distance measurement information obtained by the stereo camera and the distance measurement information based on an output signal of the radar 11 may be used in combination to detect the vehicle-to-vehicle distance between the other vehicle and the own vehicle 2 and the relative vehicle speed of the other vehicle.

The vehicle state recognition unit 22 includes, as a major function thereof, a vehicle speed detection unit 221 that detects the vehicle speed of the own vehicle 2. The vehicle speed detection unit 221 detects the vehicle speed of the own vehicle 2 on the basis of a detection signal of the vehicle speed sensor 13.

The driver request recognition unit 23 includes, as major functions thereof, a target vehicle speed setting unit 231 that sets the target vehicle speed of the own vehicle 2 according to an instruction of the driver, a target vehicle-to-vehicle distance setting unit 232 that sets a target vehicle-to-vehicle distance according to an instruction of the driver if a preceding vehicle is present in front of the own vehicle 2, and a target travel mode setting unit 233 that sets a target travel mode of the own vehicle 2 according to an instruction of the driver.

The driver request recognition unit 23 carries out the processing for setting by the foregoing setting units 231, 232 and 233 in the case where it has been instructed, by means of an operation signal of the vehicle speed control ON/OFF operation unit 15, to carry out the vehicle speed control.

The target vehicle speed setting unit 231 sets the target vehicle speed desired by the driver on the basis of an operation signal of the vehicle speed setting operation unit 16. In the present embodiment, the vehicle speed setting operation unit 16 can be operated to instruct, to the driver request recognition unit 23, a current vehicle speed of the own vehicle 2 or a vehicle speed obtained by adding a desired increment (>0) or decrement (<0) to the current vehicle speed within a predetermined vehicle speed range as a target vehicle speed.

Then, the target vehicle speed setting unit 231 sets the target vehicle speed according to the instruction given by operating the vehicle speed setting operation unit 16. A vehicle speed value (a latest value) detected by the vehicle speed detection unit 221 is used as the current vehicle speed of the own vehicle 2 required for the setting.

Alternatively, an arrangement may be made such that a target vehicle speed value (a vehicle speed value within the predetermined vehicle speed range) can be directly instructed to the driver request recognition unit 23 by operating the vehicle speed setting operation unit 16.

The target vehicle-to-vehicle distance setting unit 232 sets a target vehicle-to-vehicle distance desired by the driver on the basis of an operation signal of the vehicle-to-vehicle distance setting operation unit 17. In the present embodiment, the vehicle-to-vehicle distance setting operation unit 17 can be operated to instruct a plurality of steps of magnitude scale of a target vehicle-to-vehicle distance (e.g. a magnitude scale of vehicle-to-vehicle distance divided into three steps of large, medium and small) to the driver request recognition unit 23.

Then, the target vehicle-to-vehicle distance setting unit 232 sets the target vehicle-to-vehicle distance according to a predetermined arithmetic expression or map on the basis of the instructed magnitude scale of the vehicle-to-vehicle distance and the current vehicle speed of the own vehicle 2 detected by the vehicle speed detection unit 221.

Alternatively, an arrangement may be made such that the value of the target vehicle-to-vehicle distance (the value of the vehicle-to-vehicle distance within a predetermined range based on a vehicle speed) can be directly instructed to the driver request recognition unit 23 by operating the vehicle-to-vehicle distance setting operation unit 17.

The target travel mode setting unit 233 sets a target travel mode desired by the driver according to an operation signal of the travel mode setting operation unit 18. The target travel mode denotes the type of the travel mode (especially the mode in which acceleration is implemented (an acceleration operation pattern)) of the own vehicle 2. In the present embodiment, it is possible to selectively instruct, for example, two types of target travel mode, namely, a normal mode and a sports mode, to the driver request recognition unit 23 by operating the travel mode setting operation unit 18. Thus, the target travel mode is variably determined.

The normal mode is a general-purpose target travel mode (more specifically, a target travel mode in which the acceleration/deceleration speed of the vehicle 2 is frequently maintained to a relatively low level), while the sports mode is a target travel mode that places more emphasis on acceleration/deceleration performance of the vehicle 2, as compared with the normal mode (more specifically, a target travel mode in which more marked acceleration or deceleration is likely to be implemented than in the normal mode).

Then, the target travel mode setting unit 233 sets the target travel mode instructed by an operation signal of the travel mode setting operation unit 18 as the element that defines the target travel mode (the mode whereby to implement acceleration) in actual vehicle speed control of the own vehicle 2 (the element to be reflected in the actual vehicle speed control).

In the present embodiment, the target travel mode has been determined by operating the travel mode setting operation unit 18. Alternatively, however, an arrangement may be made such that the target travel mode can be automatically determined on the basis of a past travel history of the vehicle 2. For example, in the travel history of the vehicle 2 in a past given period of time, if the driver has carried out, at a high frequency (a great number of times), acceleration or deceleration at an acceleration/deceleration speed that is a predetermined level or more, then the sports mode may be determined as the target travel mode, and if the frequency is low, then the normal mode may be determined as the target travel mode.

The vehicle speed control unit 24 is a functional unit that carries out control processing for the vehicle speed control in the case where it has been instructed to carry out the vehicle speed control by operating the vehicle speed control ON/OFF operation unit 15.

The control processing by the vehicle speed control unit 24 will now be outlined. In the control processing, basically, the vehicle speed control unit 24 sequentially determines, at a predetermined control processing cycle, the manipulated variable for control (control input) for controlling the vehicle speed of the own vehicle 2 on the basis of the target vehicle speed, the target vehicle-to-vehicle distance, and the target travel mode set by the driver request recognition unit 23.

The manipulated variable for control corresponds to the manipulated variable for vehicle speed control in the present invention. The manipulated variable for control in the present embodiment is a target acceleration/deceleration (a target value of acceleration/deceleration) of the own vehicle 2. If the value of the acceleration/deceleration is a positive value, then it means acceleration in a speed increasing direction, and if the value is a negative value, then it means acceleration in a speed decreasing direction (deceleration).

Then, the vehicle speed control unit 24 controls the vehicle speed by controlling the driving/braking force (the driving force (propulsive force) or the braking force) of the vehicle 2 through the actuator device 3 (the engine 4 and the brake device 5) on the basis of the determined target acceleration/deceleration (the manipulated variable for control).

In this case, if there is no preceding vehicle in front of the own vehicle 2 (if the preceding vehicle is not detected by the other-vehicle detection unit 211 of the external situation recognition unit 21), then basically, the vehicle speed control unit 24 sequentially determines the target acceleration/deceleration (the manipulated variable for control) such that the actual vehicle speed of the own vehicle 2 is maintained at the target vehicle speed or a vehicle speed in the vicinity thereof as much as possible.

Further, if a preceding vehicle exists in front of the own vehicle 2 (if the preceding vehicle has been detected by the other-vehicle detection unit 211 of the external situation recognition unit 21), then basically, the vehicle speed control unit 24 sequentially determines the target acceleration/deceleration (the manipulated variable for control) such that the actual vehicle-to-vehicle distance between the own vehicle 2 and the preceding vehicle is maintained at the target vehicle-to-vehicle distance or a vehicle-to-vehicle distance in the vicinity thereof as much as possible.

However, the vehicle speed control unit 24 sequentially determines the target acceleration/deceleration (the manipulated variable for control) while maintaining balance between minimizing the travel inhibition degree of the own vehicle 2 estimated from the situations around the own vehicle 2 (the level of the possibility that the travel of the own vehicle 2 will be inhibited by other vehicles or the like) recognized by the external situation recognition unit 21 and satisfying driver requests (the target vehicle speed, the target vehicle-to-vehicle distance, and the target travel mode) as much as possible.

The vehicle speed control unit 24 carrying out the control processing as described above includes, as major functions thereof, a travel inhibition degree function determination unit 241 that determines a travel inhibition degree function, which represents a travel inhibition degree index value indicating an estimated travel inhibition degree of the own vehicle 2, as the function of the value of a target acceleration/deceleration (the manipulated variable for control), a utility function determination unit 242 that determines a utility function, which represents a utility index value indicating an effectiveness level for satisfying a driver request, as the function of the value of a target acceleration/deceleration (manipulated variable for control), an appropriateness function determination unit 243 that determines an appropriateness function indicating the appropriateness of each value of a target acceleration/deceleration (the manipulated variable for control) by combining the travel inhibition degree function and the utility function, an appropriate-for-control manipulated variable determination unit 244 that determines an appropriate target acceleration/deceleration as an appropriate-for-control manipulated variable (an appropriate manipulated variable for control) on the basis of the appropriateness function, and a driving/braking force control unit 245 that controls the driving/braking force (the driving force or the braking force) generated by the actuator device 3 on the basis of the appropriate target acceleration/deceleration.

The travel inhibition degree index value in the present embodiment is a real value of zero or more. Further, the travel inhibition degree index value corresponding to an arbitrary value of the target acceleration/deceleration is an index value, which means that the possibility of the travel of the own vehicle 2 being inhibited (e.g. contact with an other vehicle) increases as the index value increases if the vehicle speed of the own vehicle 2 is controlled (if the vehicle speed is increased or decreased) on the basis of the value of the target acceleration/deceleration corresponding to the index value.

The utility index value in the present embodiment is a real value of zero or more. Further, the utility index value corresponding to an arbitrary value of the target acceleration/deceleration is an index value, which means that the effectiveness for satisfying a driver request increases as the index value increases if the vehicle speed of the own vehicle 2 is controlled (in the case where the vehicle speed is increased or decreased) on the basis of the target acceleration/deceleration corresponding to the index value.

The appropriateness in the present embodiment is a real value of zero or more. Further, the appropriateness corresponding to an arbitrary value of the target acceleration/deceleration means that, as the value of the appropriateness increases, the appropriateness for controlling the vehicle speed of the own vehicle 2 on the basis of the value of the target acceleration/deceleration corresponding to the value increases.

The following will describe the control processing by a travel control apparatus 1, centering around the control processing by the vehicle speed control unit 24.

In the case where it has been instructed by the driver of the vehicle 2 through the operation of the vehicle speed control ON/OFF operation unit 15 to carry out the vehicle speed control, the travel control apparatus 1 carries out the foregoing processing by the external situation recognition unit 21, the vehicle state recognition unit 22 and the driver request recognition unit 23 at a predetermined control processing cycle.

In parallel therewith, the travel control apparatus 1 carries out the control processing by the vehicle speed control unit 24 at a predetermined arithmetic processing cycle.

The vehicle speed control unit 24 first carries out the processing by the travel inhibition degree function determination unit 241 and the utility function determination unit 242 as described below.

The travel inhibition degree function determination unit 241 determines the travel inhibition degree function on the basis of the peripheral situations of the vehicle 2 recognized by the external situation recognition unit 21.

More specifically, the travel inhibition degree function determination unit 241 first determines a function that denotes the relationship between the level of possibility of the inhibition of the travel of the own vehicle 2 by each of other vehicles (a travel inhibition degree index value related to the other vehicles) and the target acceleration/deceleration (manipulated variable for control) on each of other vehicles, the existence of which has been detected in an area in front of the own vehicle 2 by the other-vehicle detection unit 211 of the external situation recognition unit 21 (including other vehicles traveling in lane areas that are different from the lane area in which the own vehicle 2 is traveling).

Hereinafter, the function will be referred to as an object-specific travel inhibition degree function fr_i. The suffix "i" of fr_i means an identifier (e.g. an integer value of 1 or more) that discriminates each of the other vehicles, the presence of which has been detected by the other-vehicle detection unit 211. Further, the object-specific travel inhibition degree function fr_i corresponds to the sub travel inhibition degree function in the present invention.

The function value of the object-specific travel inhibition degree function fr_i (the function value corresponding to each value of the target acceleration/deceleration) is a real value of zero or more and equal to or less than a predetermined upper limit value (e.g. 1). The function value of fr_i corresponding to each value of the target acceleration/deceleration (the manipulated variable for control) means that, as the value increases, the level of possibility of the travel of the own vehicle 2 being inhibited by another vehicle of interest increases.

In the present embodiment, the method (algorithm) for determining the object-specific travel inhibition degree function fr_i is established beforehand for each of a plurality of types of situations related to the locations of other vehicles around the own vehicle 2 (a plurality of types of situations which are different from each other in the location pattern of the own vehicle 2 and other vehicles and the number of other vehicles or the like). Further, the travel inhibition degree function determination unit 241 determines, according to the predetermined method, the object-specific travel inhibition degree function fr_i of each of other vehicles, the presence of which has been detected by the other-vehicle detection unit 211.

In this case, the function value of the object-specific travel inhibition degree function fr_i (the function value corresponding to each value of the target acceleration/deceleration) is determined to increase with an increasing possibility of a predicted contact in the future between an other vehicle of interest and the own vehicle 2.

More specifically, the travel inhibition degree function determination unit 241 determines for each of other vehicles, the presence of which has been detected by the other-vehicle detection unit 211 of the external situation recognition unit 21, the probability that the other vehicles are expected to be traveling in front of the own vehicle 2 in the future (the future immediately after the current time). The probability is determined based on a relative relationship (a relative position, a relative speed or the like) between the own vehicle 2 and an other vehicle or a relative relationship (a relative position, a relative speed or the like) between other vehicles.

Further, the travel inhibition degree function determination unit 241 determines, for each of other vehicles, the object-specific travel inhibition degree function, which is to be applied in the case where it is assumed that an other vehicle of interest is certain to be traveling in front of the own vehicle 2 in the future (the future immediately after the current time), as a reference object-specific travel inhibition degree function fr0_i.

The reference object-specific travel inhibition degree function fr0_i (hereinafter referred to as the object-specific reference travel inhibition degree function fr0_i) is determined such that the function value corresponding to each target acceleration/deceleration increases as the possibility of the contact in the future between the own vehicle 2 and the other vehicle of interest under the foregoing assumption increases. The object-specific reference travel inhibition degree function fr0_i corresponds to the reference sub travel inhibition degree function in the present invention.

Then, the travel inhibition degree function determination unit 241 finally determines the object-specific travel inhibition degree function fr_i of each of other vehicles on the basis of the object-specific reference travel inhibition degree function fr0_i and the probability corresponding to each of other vehicles.

The following will describe more specific setting examples of the object-specific travel inhibition degree function fr_i.

Figure 2A:
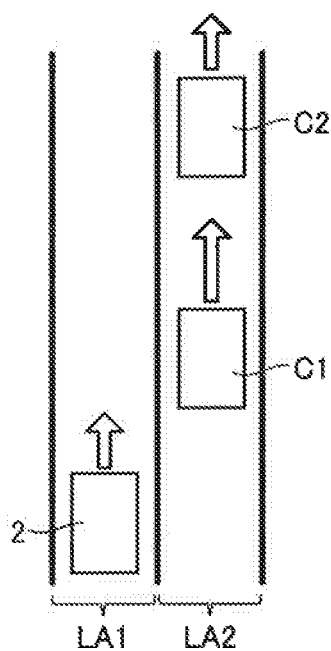
FIG. 2A and FIG. 2B are diagrams for explaining the processing by a travel inhibition degree function determination unit illustrated in FIG. 1.

A first example assumes a situation in which two other vehicles C1 and C2 are traveling in tandem in a lane area for normal travel LA2 and the own vehicle 2 is traveling behind the other vehicles C1 and C2 in a lane area for passing LA1 on the left side of the lane area for normal travel LA2, as illustrated in FIG. 2A.

In this situation, the external situation recognition unit 21 has detected the directions, the vehicle-to-vehicle distances, and the relative vehicle speeds of the other vehicles C1 and C2 and also recognized the lane areas LA1 and LA2, respectively.

The first example is an example applied to the case where the own vehicle 2 is traveling in a country (e.g. the United States of America) in which an area on the right side of a road is specified as a normal travel area of vehicles by regulations. The same will apply to a second example, which will be hereinafter discussed.

In the situation of the first example, of the other vehicles C1 and C2, attention will be focused on, for example, the other vehicle C1 on the near side. If the other vehicle C1 changes the lane from the lane area for normal travel LA2 to the lane area for passing LA1 to overtake the other vehicle C2 on the farther side, then the possibility of the contact between the other vehicle C1 and the own vehicle 2 (thus the possibility of the travel of the own vehicle 2 being inhibited by the other vehicle C1) increases.

Therefore, to determine the object-specific travel inhibition degree function fr_1 regarding the other vehicle C1, the travel inhibition degree function determination unit 241 determines the probability of the other vehicle C1 changing the lane to cut in front of the own vehicle 2 (hereinafter referred to as the cut-in probability Pr_1 in some cases). The cut-in probability Pr_1 is, in other words, the probability that the other vehicle C1 is expected to be traveling in front of the own vehicle 2 in the future.

The cut-in probability Pr_1 is determined based on, for example, the position and the vehicle speed of each of the other vehicles C1 and C2 (the relative position and vehicle speed with respect to the own vehicle 2) by using a predetermined map or the like.

Specifically, in the situation illustrated in FIG. 2A, of the other vehicles C1 and C2, if the vehicle speed of the other vehicle C1 on the near side is higher than the vehicle speed of the other vehicle C2 on the farther side, then there is a high possibility that the other vehicle C1 will change the lane into the lane area for passing LA1 to overtake the other vehicle C2, thus cutting in to the front of the own vehicle 2. This possibility increases as the vehicle speed of the other vehicle C1 on the near side is higher than the vehicle speed of the other vehicle C2 on the farther side or as the vehicle-to-vehicle distance between the other vehicles C1 and C2 decreases.

Hence, in the situation illustrated in FIG. 2A, the travel inhibition degree function determination unit 241 determines the cut-in probability Pr_1 such that the cut-in probability Pr_1 increases as the vehicle speed of the other vehicle C1 on the near side is higher than the vehicle speed of the other vehicle C2 on the farther side and the cut-in probability Pr_1 increases as the vehicle-to-vehicle distance between the other vehicles C1 and C2 decreases.

Further, in the situation illustrated in FIG. 2A, the travel inhibition degree function determination unit 241 determines, as the object-specific reference travel inhibition degree function fr0_1 for the other vehicle C1, the object-specific travel inhibition degree function in the case where it is assumed that the other vehicle C1 has changed the lane and cut in to the front of the own vehicle 2 as described above (in the case where the cut-in probability is assumed to be "1").

The object-specific reference travel inhibition degree function fr0_1 defines the reference change pattern of the function value of the object-specific travel inhibition degree function fr_1 for the other vehicle C1 with respect to the target acceleration/deceleration (the manipulated variable for control).

Figure 2B:
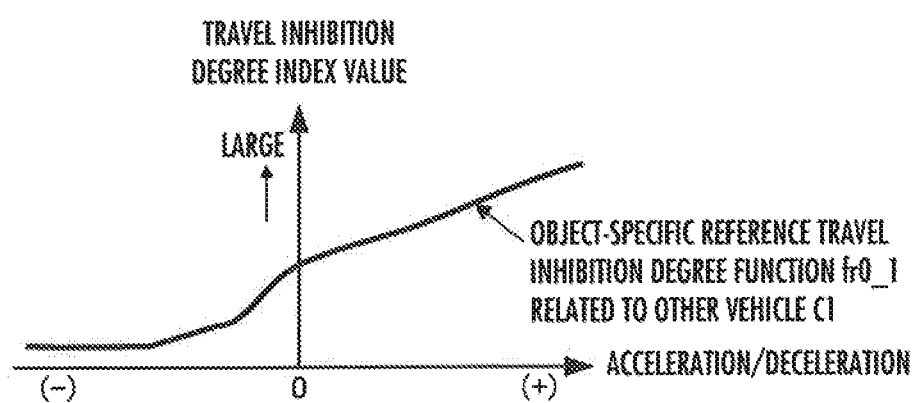

The object-specific reference travel inhibition degree function fr0_1 is determined according to, for example, the waveform pattern illustrated in FIG. 2B. In the situation wherein the other vehicle C1 has cut in front of the own vehicle 2 from the situation illustrated in FIG. 2A, the possibility of the contact between the own vehicle 2 and the other vehicle C1 is considered to increase in the case where the target acceleration/deceleration of the own vehicle 2 is set to a value in the vicinity of zero (in the case where the vehicle speed of the own vehicle 2 is maintained to the vicinity of the current vehicle speed) or in the case where the acceleration/deceleration is set to an speed increasing side (a positive acceleration/deceleration).

Hence, the object-specific reference travel inhibition degree function fr0_1 illustrated in FIG. 2B is determined according to a waveform pattern in which the function value on the vertical axis (the travel inhibition degree index value) becomes relatively larger in the case where the value of the acceleration/deceleration on a horizontal axis is a value in the vicinity of zero and in the case where the value thereof is a value on the speed increasing side ($>0$), and the function value (the travel inhibition degree index value) increases as the acceleration/deceleration increases toward the speed increasing side.

The function value of fr0_1 at each value of the target acceleration/deceleration is a value that depends upon, for example, the state (the vehicle speed or the acceleration) of the own vehicle 2 detected by the vehicle state recognition unit 22 and the position and the relative vehicle speed of the other vehicle C1 expected to cut in front of the own vehicle 2.

Then, the travel inhibition degree function determination unit 241 determines, as the object-specific travel inhibition degree function fr_1 for the other vehicle C1, the function obtained by multiplying the object-specific reference travel inhibition degree function fr0_1 determined as described above by the cut-in probability Pr_1 (=Pr_1×fr0_1).

Figure 3A:
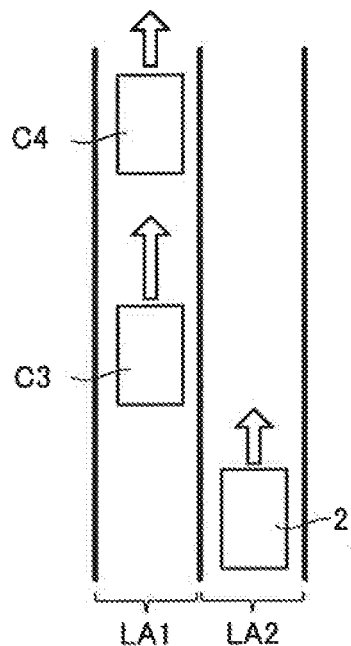
FIG. 3A and FIG. 3B are diagrams for explaining the processing by the travel inhibition degree function determination unit illustrated in FIG. 1.

Further, as a second example, a situation is assumed, in which the own vehicle 2 is traveling in the lane area for normal travel LA2 and other vehicles C3 and C4 are traveling in tandem ahead of the own vehicle 2 in the lane area for passing LA1 on the left side of the lane area for normal travel LA2, as illustrated in, for example, FIG. 3A.

In this situation, the external situation recognition unit 21 has detected the direction, the vehicle-to-vehicle distance, and the relative vehicle speed of each of the other vehicles C3 and C4 and has also recognized the lane areas LA1 and LA2.

In the situation illustrated in FIG. 3A, of the other vehicles C3 and C4, attention will be focused on, for example, the other vehicle C4 on the farther side. If the other vehicle C4 changes the lane from the lane area for passing LA1 to the lane area for normal travel LA2 to yield the right of way to the other vehicle C3 on the near side, then the possibility of the contact between the other vehicle C4 and the own vehicle 2 (thus the possibility of the travel of the own vehicle 2 being inhibited by the other vehicle C4) increases.

Therefore, to determine the object-specific travel inhibition degree function fr_4 regarding the other vehicle C4, the travel inhibition degree function determination unit 241 determines the probability of the other vehicle C4 changing the lane to cut in front of the own vehicle 2 (hereinafter referred to as the cut-in probability Pr_4).

The cut-in probability Pr_4 is determined based on, for example, the position and the vehicle speed of each of the other vehicles C3 and C4 (the relative position and vehicle speed with respect to the own vehicle 2) by using a predetermined map or the like, as with the case of the first example.

Specifically, in the situation illustrated in FIG. 3A, of the other vehicles C3 and C4, if the vehicle speed of the other vehicle C3 on the near side is higher than the vehicle speed of the other vehicle C4 on the farther side, then there is a high possibility that the other vehicle C4 will change the lane into the lane area for normal travel LA2 to yield the right of way to the other vehicle C3, thus cutting in front of the own vehicle 2. This possibility increases as the vehicle speed of the other vehicle C3 on the near side is higher than the vehicle speed of the other vehicle C4 on the farther side or as the vehicle-to-vehicle distance between the other vehicles C3 and C4 decreases.

Hence, in the situation illustrated in FIG. 3A, the travel inhibition degree function determination unit 241 determines the cut-in probability Pr_4 such that the cut-in probability Pr_4 increases as the vehicle speed of the other vehicle C3 on the near side is higher than the vehicle speed of the other vehicle C4 on the farther side and also the cut-in probability Pr_4 increases as the vehicle-to-vehicle distance between the other vehicles C3 and C4 decreases.

Further, in the situation illustrated in FIG. 3A, the travel inhibition degree function determination unit 241 determines, as the object-specific reference travel inhibition degree function fr0_4 for the other vehicle C4, the object-specific travel inhibition degree function in the case where it is assumed that the other vehicle C4 has changed the lane and cut in front of the own vehicle 2 as described above (in the case where the cut-in probability Pr_4 is assumed to be "1").

The object-specific reference travel inhibition degree function fr0_4 defines the reference change pattern of the function value of the object-specific travel inhibition degree function fr_4 for the other vehicle C4 with respect to the target acceleration/deceleration (the manipulated variable for control).

Figure 3B:
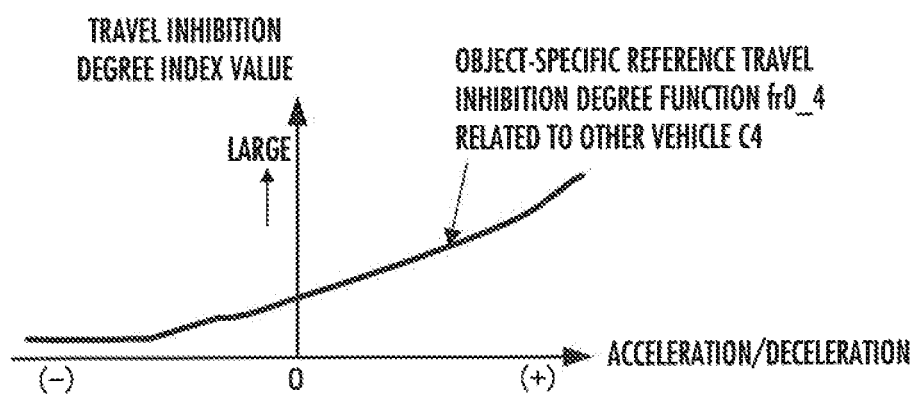

The object-specific reference travel inhibition degree function fr0_4 is determined according to, for example, the waveform pattern illustrated in FIG. 3B. In the situation wherein the other vehicle C4 has cut in front of the own vehicle 2 from the situation illustrated in FIG. 3A, the possibility of the contact between the own vehicle 2 and the other vehicle C4 is considered to increase in the case where the target acceleration/deceleration of the own vehicle 2 is set to an acceleration on an speed increasing side.

Hence, the object-specific reference travel inhibition degree function fr0_4 illustrated in FIG. 3B is determined according to a waveform pattern in which the function value (the travel inhibition degree index value) increases as the value of the acceleration/deceleration on the horizontal axis increases toward the speed increasing side.

The function value of fr0_4 at each value of the target acceleration/deceleration is a value that depends upon, for example, the state (the vehicle speed or the acceleration) of the own vehicle 2 detected by the vehicle state recognition unit 22 and the position and the relative vehicle speed of the other vehicle C4 assumed to cut in front of the own vehicle 2.

Then, the travel inhibition degree function determination unit 241 determines, as the object-specific travel inhibition degree function fr_4 for the other vehicle C4, the function obtained by multiplying the object-specific reference travel inhibition degree function fr0_4 determined as described above by the cut-in probability Pr_4 (=Pr_4×fr0_4).

The travel inhibition degree function determination unit 241 determines, as described above, the object-specific travel inhibition degree function fr_i for each of the other vehicles detected by the other-vehicle detection unit 211.

Supplementarily, to determine the cut-in probability Pr_i, such as the cut-in probability Pr_1, Pr_4 or the like, the scale of the size of an available space in the lane area to which an other vehicle is trying to cut in (a lane area in front of the own vehicle 2) may be reflected on the cut-in probability Pr_i. For example, the distance between a vehicle preceding the own vehicle 2 and the own vehicle 2 in a lane area in which the own vehicle 2 is traveling may be reflected on the cut-in probability Pr_i such that the cut-in probability is set to be smaller in the case where the distance is smaller (in the case where the available space for the cut-in is smaller) than in the case where the distance is larger (in the case where there is a sufficient available space for the cut-in).

Further, in the situation illustrated in, for example, FIG. 2A, if the vehicle speed of the own vehicle 2 is higher than the vehicle speed of the other vehicle C1, then the possibility that the other vehicle C1 will cut in a lane area for passing LA1 in which the own vehicle 2 is traveling is considered to become low. Hence, if the vehicle speed of the own vehicle 2 is higher than the vehicle speed of the other vehicle C1, then the cut-in probability Pr_1 for the other vehicle C1 may be set to be smaller than in an otherwise case.

This arrangement makes it possible to properly reflect the relative relationship between the own vehicle 2 and an other vehicle in addition to the relative relationship between other vehicles in determining the cut-in probability Pr_i.

Then, the travel inhibition degree function determination unit 241 combines the object-specific travel inhibition degree function fr of each of the other vehicles thereby to determine the travel inhibition degree function fr corresponding to the current situation around the own vehicle 2.

Specifically, a function obtained by adding up the object-specific travel inhibition degree function fr_i of each of the other vehicles (a function at which the function value corresponding to each value of the target acceleration/deceleration coincides with the total sum of the function values of the object-specific travel inhibition degree functions fr_i for the individual other vehicles) is normalized to determine the travel inhibition degree function fr based on the situation around the own vehicle 2.

The normalization is a processing in which the function obtained by adding up the object-specific travel inhibition degree functions fr_i of the individual other vehicles is multiplied by a reciprocal value of the total sum of the upper limit values of the object-specific travel inhibition degree functions fr_i of the individual other vehicles so as to limit the function value of the travel inhibition degree function fr to a value of 1 or less.

For example, in the case where three other vehicles have been detected by the other-vehicle detection unit 211 of the external situation recognition unit 21, if the upper limit value of the function value of each of the object-specific travel inhibition degree functions fr_1, fr_2 and fr_3 of the individual other vehicles is 1, then (fr_1+fr_2+fr_3)/3 is determined as the travel inhibition degree function fr.

This completes the description of the processing by the travel inhibition degree function determination unit 241.

The processing by the utility function determination unit 242 will now be described. The utility function determination unit 242 determines a utility function on the basis of a driver request (a target vehicle speed, a target vehicle-to-vehicle distance, or a target travel mode) recognized by the driver request recognition unit 23 and the state (a vehicle speed or the like) of the own vehicle 2 recognized by the vehicle state recognition unit 22.

More specifically, the utility function determination unit 242 first determines the function for each request that indicates the relationship between the degree of effectiveness for satisfying the request of each of the target vehicle speed, the target vehicle-to-vehicle distance and the target travel mode (the utility index value corresponding to each request) and a target acceleration/deceleration (the manipulated variable for control).

Hereinafter, the function for each request will be generically referred to as the request-specific utility function fu_j. The suffix "j" of fu_j means an identifier (e.g. an integer value of 1 or more) that discriminates the type of a driver request.

Further, the request-specific utility function fu_j corresponding to the target vehicle speed will be referred to as the vehicle speed request utility function fu_1, the request-specific utility function fu_j corresponding to the target vehicle-to-vehicle distance will be referred to as the inter-vehicular request utility function fu_2, and the request-specific utility function fu_j corresponding to the target travel mode will be referred to as the travel mode request utility function fu_3.

These request-specific utility functions fu_1, fu_2 and fu_3 correspond to the first sub utility function, the second sub utility function and the third sub utility function, respectively, in the present invention.

The function value of each request-specific utility function fu_j (the function value corresponding to each value of a target acceleration/deceleration) has a meaning as a utility index value related to a driver request corresponding to the function fu_j and is a real value equal to or more than zero and equal to or less than a predetermined upper limit value (e.g. 1). Further, as the function value of fu_j corresponding to each value of the target acceleration/deceleration (the manipulated variable for control) becomes larger, it means that the degree of effectiveness in satisfying a driver request becomes higher.

Among the request-specific utility functions fu_j, the travel mode request utility function fu_3 is determined as described below.

The travel mode request utility function fu_3 is determined beforehand for each type of target travel mode (the normal mode or the sports mode). The utility function determination unit 242 selects, from the travel mode request utility functions fu_3, the travel mode request utility function fu_3 corresponding to the target travel mode set by the driver through the travel mode setting operation unit 18.

Figure 4:
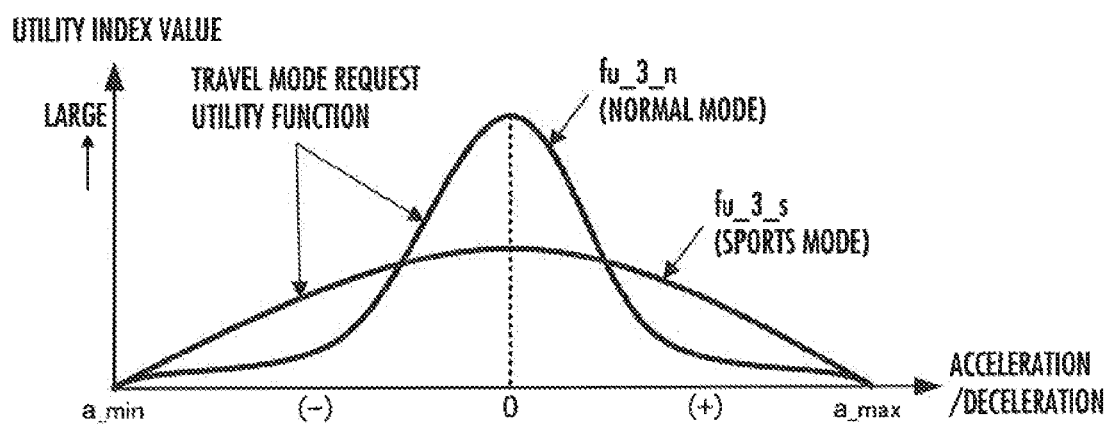
FIG. 4 is a diagram for explaining the processing by a utility function determination unit illustrated in FIG. 1.

In this case, the travel mode request utility functions fu_3 corresponding to the normal mode and the sports mode, respectively, are determined beforehand according to, for example, the waveform patterns illustrated in the graph of FIG. 4.

The travel mode request utility function fu_3 corresponding to the normal mode (hereinafter denoted by fu_3_n) is a function exhibiting a convex waveform in which the function value (the utility index value) reaches a peak value when the target acceleration/deceleration is zero.

In this case, more specifically, the waveform of fu_3_n is set such that a function value in a range in which the target acceleration/deceleration becomes relatively close to zero is markedly larger than a function value in a range in which the target acceleration/deceleration is far from zero. In other words, the waveform of fu_3_n is set such that the degree of effectiveness is markedly higher in the case where the value of the target acceleration/deceleration is a value that is in the vicinity of zero and relatively small than in the case where the value of the target acceleration/deceleration is a value that is relatively large.

Further, the travel mode request utility function fu_3 corresponding to the sports mode (hereinafter denoted by fu_3_s) is a function exhibiting a convex waveform in which the function value (the utility index value) reaches a peak value when the target acceleration/deceleration is zero.

However, the waveform of fu_3_s is set such that the function value decreases more gently than fu_3_n as the value of the target acceleration/deceleration moves away from zero. For this reason, the function value of fu_3_s is maintained at a value near the peak in a wider range than that of fu_3_n.

Thus, the waveform of fu_3_s is set such that the degree of effectiveness remains relatively high even in the case where the value of the target acceleration/deceleration is relatively large.

Further, the vehicle speed request utility function fu_1 among the request-specific utility functions fu_j is determined as described below.

Figure 5A:
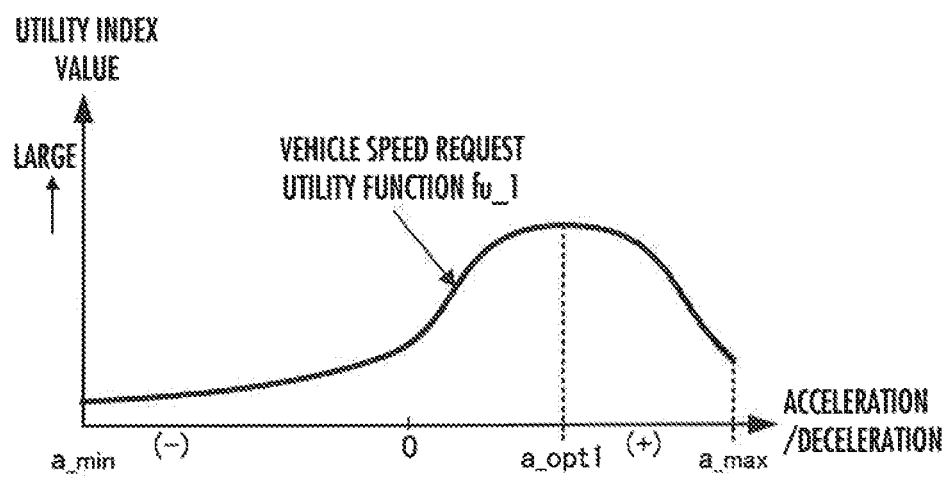
FIG. 5A and FIG. 5B are diagrams for explaining the processing by the utility function determination unit illustrated in FIG. 1.

In the present embodiment, the vehicle speed request utility function fu_1 is a function of a normally distributed waveform, as illustrated in FIG. 5A. Then, a target acceleration/deceleration value a_opt1 at which the function value reaches a peak value (hereinafter referred to as the peak correspondence acceleration/deceleration value a_opt1) is determined based on a target vehicle speed set by the target vehicle speed setting unit 231 of the driver request recognition unit 23 according to an operation of the vehicle speed setting operation unit 16 and a detection value of the vehicle speed acquired by the vehicle speed detection unit 221 of the vehicle state recognition unit 22 on the basis of an output of the vehicle speed sensor 13.

Figure 5B:
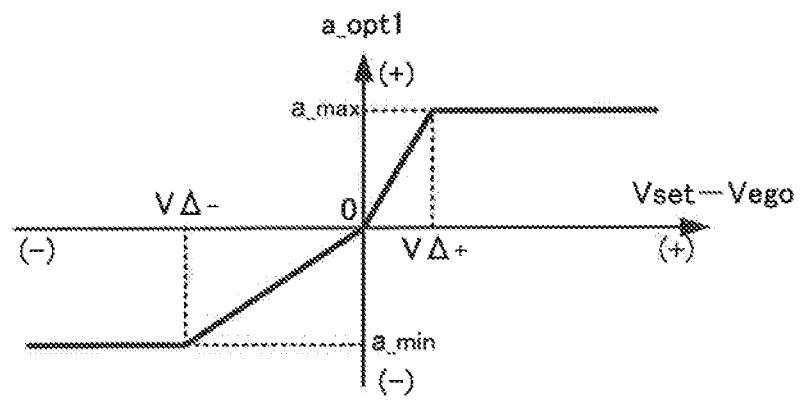

Specifically, the peak correspondence acceleration/deceleration value a_opt1 is determined as illustrated in the graph of FIG. 5B on the basis of the difference between a target vehicle speed that is currently set (hereinafter denoted by Vset) and a detection value of the current vehicle speed (hereinafter denoted by Vego) (=Vset−Vego).

Specifically, a_opt1 is determined as indicated by the following expressions (1a) to (1e).

In the case where Vset−Vego>VΔ+, $$a\_opt1 = a\_max \quad (1a)$$

In the case where 0<Vset−Vego≤VΔ+, $$a\_opt1 = (a\_max/V\Delta+) \cdot (Vset - Vego) \quad (1b)$$

In the case where Vset−Vego=0 (In the case where Vset=Vego), $$a\_opt1 = 0 \quad (1c)$$

In the case where 0>Vset−Vego≥VΔ−, $$a\_opt1 = (a\_min/V\Delta-) \cdot (Vset - Vego) \quad (1d)$$

In the case where Vset−Vego<VΔ−, $$a\_opt1 = a\_min \quad (1e)$$

where a_max denotes a maximum value (>0) of the acceleration/deceleration of the vehicle 2, a_min denotes a minimum value (<0) of the acceleration/deceleration of the vehicle 2, VΔ+ denotes a positive predetermined value, and VΔ− denotes a negative predetermined value. These values are determined in advance.

Therefore, the peak correspondence acceleration/deceleration value a_opt1 is determined to take a positive value (an acceleration/deceleration value in the speed increasing direction of the vehicle speed) in the case where Vset>Vego, and determined to take a larger value as the absolute value of Vset−Vego increases within a range in which the absolute value of a_opt1 is equal to or less than a_max.

Further, the peak correspondence acceleration/deceleration value a_opt1 is determined to take a negative value (an acceleration/deceleration value in the speed decreasing direction of the vehicle speed) in the case where Vset<Vego, and determined to take a larger value as the absolute value of Vset−Vego increases within a range in which the absolute value of a_opt1 is equal to or less than a_min.

The peak correspondence acceleration/deceleration value a_opt1 determined as described above means the acceleration/deceleration value that is appropriate for bringing the actual vehicle speed of the own vehicle 2 close to the target vehicle speed Vset.

The vehicle speed request utility function fu_1 is a normally distributed waveform function, so that determining the peak correspondence acceleration/deceleration value a_opt1 as described above will resultantly determine the vehicle speed request utility function fu_1.

In this case, the vehicle speed request utility function fu_1 is determined such that the function value (the utility index value) will be large in the vicinity of an acceleration/deceleration that is appropriate for bringing the actual vehicle speed of the own vehicle 2 close to the target vehicle speed Vset.

Next, the inter-vehicular request utility function fu_2 among the request-specific utility functions fu_j is determined as described below.

Figure 6A:
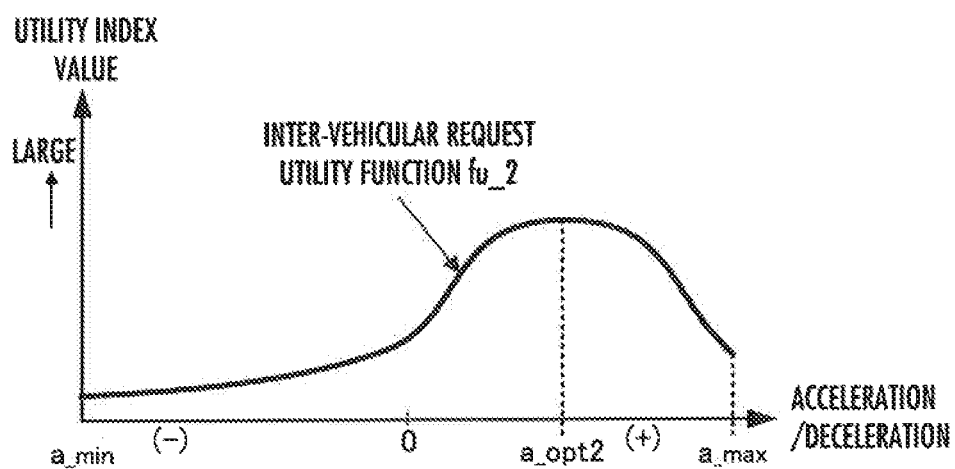
FIG. 6A and FIG. 6B are diagrams for explaining the processing by the utility function determination unit illustrated in FIG. 1.

In the present embodiment, as with the vehicle speed request utility function fu_1, the inter-vehicular request utility function fu_2 is a normally distributed waveform function, as illustrated in FIG. 6A. And a target acceleration/deceleration value a_opt2 at which the function value reaches a peak value (hereinafter referred to as the peak correspondence acceleration/deceleration value a_opt2) is determined based on a target vehicle-to-vehicle distance set by the target vehicle-to-vehicle distance setting unit 232 of the driver request recognition unit 23 in response to the operation of the vehicle speed setting operation unit 16 and a detection value of a vehicle-to-vehicle distance acquired by the vehicle-to-vehicle distance detection unit 213 of the external situation recognition unit 21.

Figure 6B:
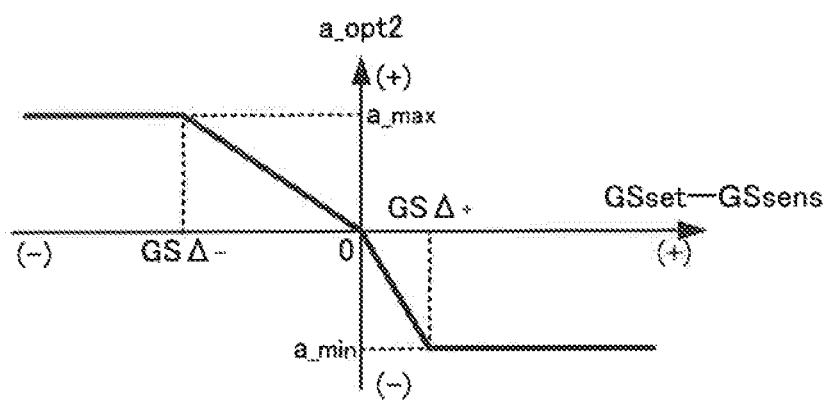

Specifically, the peak correspondence acceleration/deceleration value a_opt2 is determined as illustrated in the graph of FIG. 6B on the basis of a difference between a target vehicle-to-vehicle distance that is currently set (hereinafter denoted by GSset) and a detection value of a current vehicle-to-vehicle distance between the own vehicle 2 and an other vehicle ahead thereof (hereinafter denoted by GSsens) (=GSset−GSsens).

Specifically, a_opt2 is determined as indicated by the following expressions (2a) to (2e).

In the case where GSset−GSsens>GSΔ+, $$a\_opt2 = a\_min \quad (2a)$$

In the case where 0<GSset−GSsens GSΔ+, $$a\_opt2 = (a\_min/GS\Delta+) \cdot (GSset - GSsens) \quad (2b)$$

In the case where GSset−GSsens=0 (in the case where GSset=GSego), $$a\_opt2 = 0 \quad (2c)$$

In the case where 0>GSset−GSsens≥GSΔ−, $$a\_opt2 = (a\_max/GS\Delta-) \cdot (GSset - GSsens) \quad (2d)$$

In the case where GSset−GSsens<GSΔ−, $$a\_opt2 = a\_max \quad (2e)$$

where GSΔ+ denotes a positive predetermined value, and GSΔ− denotes a negative predetermined value. These values are determined in advance. Further, a_max and a_min denote a maximum value (>0) and a minimum value (<0), respectively, of the acceleration/deceleration of the vehicle 2, as described above.

Therefore, the peak correspondence acceleration/deceleration value a_opt2 is determined to take a negative value (an acceleration/deceleration value in the speed decreasing direction of the vehicle speed) in the case where GSset>GSsens, and determined to take a larger value as the absolute value of GSset−GSsens increases within a range in which the absolute value of a_opt2 is equal to or less than a_min.

Further, the peak correspondence acceleration/deceleration value a_opt2 is determined to take a positive value (an acceleration/deceleration value in the speed increasing direction of the vehicle speed) in the case where GSset<GSsens, and determined to take a larger value as the absolute value of GSset−GSsens increases within a range in which the absolute value of a_opt2 is equal to or less than a_max.

The peak correspondence acceleration/deceleration value a_opt2 determined as described above means the acceleration/deceleration value that is appropriate for bringing the actual vehicle-to-vehicle distance between the own vehicle 2 and the preceding vehicle close to the target vehicle-to-vehicle distance GSset.

The inter-vehicular request utility function fu_2 is a normally distributed waveform function, so that determining the peak correspondence acceleration/deceleration value a_opt2 as described above will resultantly determine the inter-vehicular request utility function fu_2.

In this case, the inter-vehicular request utility function fu_2 is determined such that the function value (the utility index value) will be large in the vicinity of an acceleration/deceleration that is appropriate for bringing the actual vehicle-to-vehicle distance between the own vehicle 2 and the preceding vehicle close to the target vehicle-to-vehicle distance GSset.

Thus, the utility function determination unit 242 determines the request-specific utility functions fu_j (j=1, 2 and 3) corresponding to the target vehicle speed, the target vehicle-to-vehicle distance, and the target travel mode, respectively.

Of the target vehicle speed and the target vehicle-to-vehicle distance, if only the target vehicle speed has been set, then the utility function determination unit 242 determines the inter-vehicular request utility function fu_2 as the function, the function value of which becomes zero at an arbitrary target acceleration/deceleration. Further, of the target vehicle speed and the target vehicle-to-vehicle distance, if only the target vehicle-to-vehicle distance has been set, then the utility function determination unit 242 determines the vehicle speed request utility function fu_1 as the function, the function value of which becomes zero at an arbitrary target acceleration/deceleration.

Then, as with the case where the travel inhibition degree function fr is determined, the utility function determination unit 242 combines the individual request-specific utility functions fu_j so as to determine the utility function fu that corresponds to a current request of the driver.

Specifically, a function obtained by adding up the request-specific utility functions fu_i (a function at which the function value corresponding to each value of the target acceleration/deceleration coincides with the total sum of the function values of the request-specific utility functions fu_i) is normalized thereby to determine the utility function fu based on a comprehensive request of the driver of the own vehicle 2.

The normalization is carried out in the same manner as that for determining the travel inhibition degree function fr. Hence, if the upper limit value of the function value of each of the request-specific utility functions fu_j (j=1, 2 and 3) corresponding to the target vehicle speed, the target vehicle-to-vehicle distance, and the target travel mode, respectively, is 1, then (fu_1+fu_2+fu_3)/3 is determined as the utility function fu.

This completes the description of the processing by the utility function determination unit 242.

The vehicle speed control unit 24 carries out the processing by the appropriateness function determination unit 243 after carrying out the processing by the travel inhibition degree function determination unit 241 and the utility function determination unit 242 as described above.

The appropriateness function determination unit 243 combines the travel inhibition degree function fr and the utility function fu thereby to determine the appropriateness function fap.

Specifically, the appropriateness function fap is determined as a function, the function value of which (the function value at each value of the target acceleration/ deceleration) becomes the product of the function value of fu and the value obtained by subtracting the function value of fr from the upper limit value (1 in this case) of the function value of fr, as indicated by the following expression (3).

$$fap = fu \cdot (1 - fr) \quad (3)$$

Figure 7A:
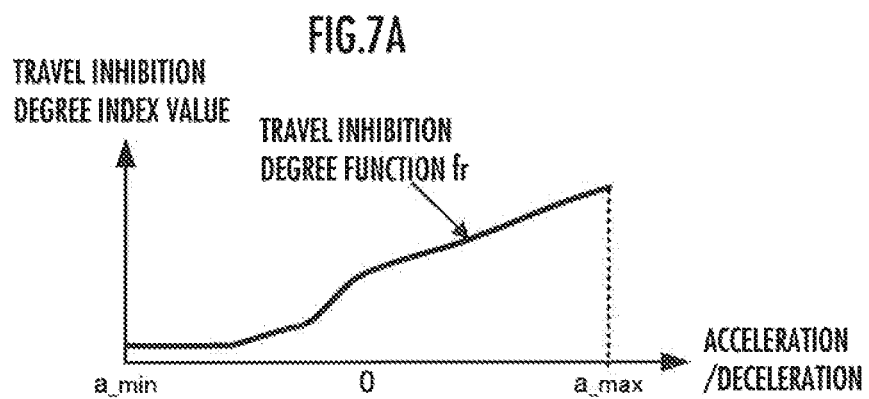
FIG. 7A, FIG. 7B, and FIG. 7C are diagrams for explaining the processing by an appropriateness function determination unit and an appropriate-for-control manipulated variable determination unit illustrated in FIG. 1.
Figure 7B:
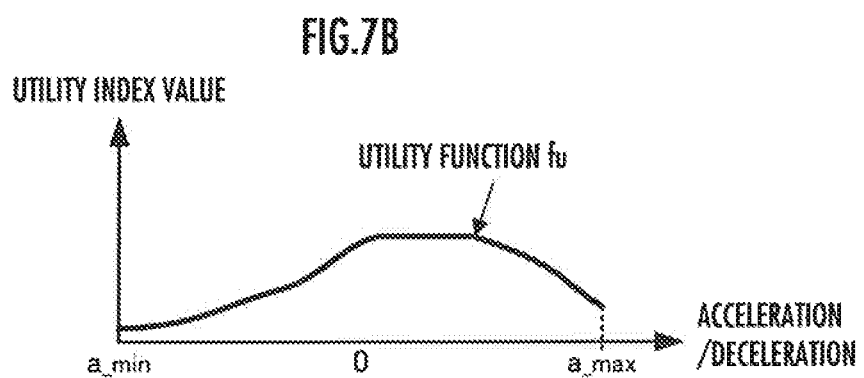
Figure 7C:
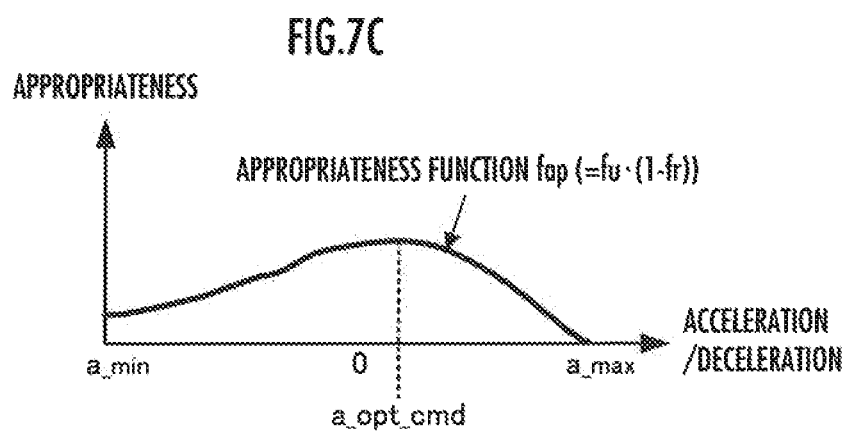

For example, if the travel inhibition degree function fr and the utility function fu are functions that exhibit the waveforms illustrated in FIG. 7A and FIG. 7B, respectively, then a function that exhibits the waveform illustrated in FIG. 7C will be determined as the appropriateness function fap.

As the function value of the travel inhibition degree function fr increases, the level of possibility that the travel of the own vehicle 2 will be inhibited increases, so that the level of the possibility that the travel of the own vehicle 2 will be inhibited decreases as the function value of a function "1−fr" increases.

Accordingly, the function value of the appropriateness function fap (the appropriateness) determined as described above increases as the appropriateness of the value of the target acceleration/deceleration corresponding thereto increases in satisfying a driver request as much as possible and also preventing the inhibition of the travel of the own vehicle 2.

Then, the vehicle speed control unit 24 carries out the processing by the appropriate-for-control manipulated variable determination unit 244. The appropriate-for-control manipulated variable determination unit 244 determines, on the basis of the appropriateness function fap determined as described above, a target appropriate acceleration/deceleration (hereinafter denoted by a_opt_cmd) as the manipulated variable for control that is appropriate for controlling the vehicle speed of the own vehicle 2.

Specifically, the appropriate-for-control manipulated variable determination unit 244 determines, as the target appropriate acceleration/deceleration a_opt_cmd, the value of an acceleration/deceleration at which the function value (the appropriateness) reaches a maximum in the appropriateness function fap, as illustrated in FIG. 7C.

Thus, the target appropriate acceleration/deceleration a_opt_cmd is determined as the value of a most appropriate acceleration/deceleration in satisfying a driver request as much as possible and also preventing the inhibition of the travel of the own vehicle 2.

Then, the vehicle speed control unit 24 carries out the processing by the driving/braking force control unit 245. The driving/braking force control unit 245 controls the engine 4 or the brake device 5 according to the target appropriate acceleration/deceleration a_opt_cmd determined by the appropriate-for-control manipulated variable determination unit 244.

Specifically, if the target appropriate acceleration/deceleration a_opt_cmd is a positive value, then the driving/braking force control unit 245 determines the target value of an output torque of the engine 4 required to attain the target appropriate acceleration/deceleration a_opt_cmd, and controls the operation of the engine 4 so as to generate an output torque of the target value.

Further, if the target appropriate acceleration/deceleration a_opt_cmd is a negative value, then the driving/braking force control unit 245 determines the target value of a braking force of the brake device 5 required to attain the target appropriate acceleration/deceleration a_opt_cmd, and controls the braking force of the brake device 5 so as to generate a braking force of the target value. If the vehicle 2 is provided with an electric motor for travel, then the braking force of the target value may be generated by a regenerative operation of the electric motor.

According to the present embodiment described above, the function value of the appropriateness function fap, which is obtained by combining the travel inhibition degree function fr and the utility function fu, denotes a function that increases as the appropriateness of the value of the target acceleration/deceleration corresponding thereto increases in satisfying a driver request (the target vehicle speed, the target vehicle-to-vehicle distance, and the target travel mode) as much as possible and also preventing the inhibition of the travel of the own vehicle 2 by other vehicles.

Further, the driving force of the vehicle 2 by the engine 4 or the braking force of the vehicle 2 by the brake device 5 is controlled according to the target appropriate acceleration/deceleration a_opt_cmd, which is the value of acceleration/deceleration at which the function value (the appropriateness) reaches a maximum in the appropriateness function fap.

Thus, the vehicle speed of the own vehicle 2 can be controlled so as to achieve, in a well-balanced manner, both maximum satisfaction of the driver requests (the target vehicle speed, the target vehicle-to-vehicle distance, and the target travel mode) and prevention of the travel of the own vehicle 2 from being inhibited by other vehicles.

Further, the travel inhibition degree function fr is determined such that the function value increases as the probability that an other vehicle is expected to cut in front of the own vehicle 2 and travel ahead thereof (the cut-in probability Pr_i) increases. Further, the travel inhibition degree function fr is determined by combining the object-specific travel inhibition degree functions fr_i determined for individual other vehicles.

Therefore, in a variety of situations in which other vehicles are present around the own vehicle 2, the reliability of the function value of the travel inhibition degree function fr corresponding to each value of the target acceleration/deceleration (the manipulated variable for control) can be enhanced. As a result, the reliability of the function value of the appropriateness function can be enhanced.

Second Embodiment

A second embodiment of the present invention will now be described with reference to FIG. 8 and FIG. 9. The present embodiment differs from the first embodiment only in the processing by the driver request recognition unit 23 of the travel control apparatus 1 and the processing by the utility function determination unit 242 of the vehicle speed control unit 24. Hence, the description of the present embodiment will center around the different aspects, and the description of the same aspects as those of the first embodiment will be omitted.

Figure 8:
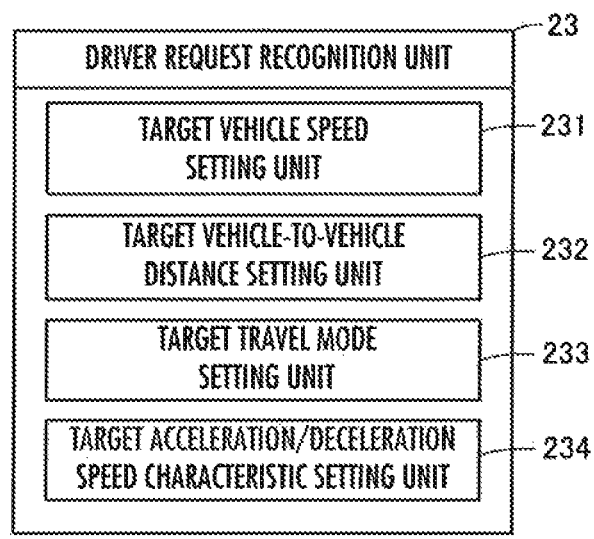
FIG. 8 is a block diagram illustrating the configuration of a driver request recognition unit of an apparatus in a second embodiment of the present invention.

As illustrated in FIG. 8, a driver request recognition unit 23 in the present embodiment is provided with a target acceleration/deceleration speed characteristic setting unit 234, which variably sets a target acceleration/deceleration speed characteristic that specifies the speed level of the acceleration or the deceleration (braking) of an own vehicle 2 in the case where the state around the own vehicle 2 recognized by an external situation recognition unit 21 is a predetermined external situation, in addition to the target vehicle speed setting unit 231, the target vehicle-to-vehicle distance setting unit 232, and the target travel mode setting unit 233 described in the first embodiment.

More specifically, in the present embodiment, the predetermined external situation is, for example, a situation in which a preceding vehicle traveling ahead of the own vehicle 2 exists. The preceding vehicle is an other vehicle that is traveling in front of the own vehicle 2 in the same lane area as the own vehicle 2 (including an other vehicle that has cut in from a lane area beside the own vehicle 2 immediately before the current time) or an other vehicle that is about to cut in front of the own vehicle 2 or a vehicle that is highly likely to cut in front of the own vehicle 2 in the future immediately after the current time.

Further, the target acceleration/deceleration speed characteristic is composed of a target acceleration speed characteristic that specifies an acceleration speed level when accelerating the own vehicle 2 in the case where the distance from the own vehicle 2 to a preceding vehicle (hereinafter referred to simply as the preceding vehicle distance) exceeds a certain reference distance (or a distance within a predetermined range that includes the reference distance), and a target deceleration speed characteristic that specifies a deceleration speed level when decelerating the own vehicle 2 in the case where the preceding vehicle distance becomes shorter than a certain reference distance (or a distance within a predetermined range that includes the reference distance).

In this case, the target acceleration speed characteristic can be selectively set from two types of characteristics, namely, a quick acceleration characteristic in which the own vehicle 2 is quickly (promptly) accelerated and a slow acceleration characteristic in which the own vehicle 2 is accelerated relatively more slowly than in the quick acceleration characteristic.

Similarly, the target deceleration speed characteristic can be selectively (variably) set from two types of characteristics, namely, a quick deceleration characteristic in which the own vehicle 2 is quickly (rapidly) decelerated, and a slow deceleration characteristic in which the own vehicle 2 is decelerated relatively more slowly than in the quick deceleration characteristic.

The reference distance is, for example, the target vehicle-to-vehicle distance set by the target vehicle-to-vehicle distance setting unit 232. Alternatively, however, the reference distance may be a distance that is different from the target vehicle-to-vehicle distance. In such a case, the driver himself/herself may set the reference distance by a predetermined operation, or the target acceleration/deceleration speed characteristic setting unit 234 may automatically set the reference distance on the basis of the target vehicle-to-vehicle distance.

Alternatively, the reference distance may be automatically set as a learning value by a travel control apparatus 1 on the basis of the past history of a travel mode of the own vehicle 2 based on the steering by the driver in a state wherein the vehicle speed control is OFF (e.g. the mode of a vehicle speed change or a steering change in response to a preceding vehicle distance).

Further, in a situation wherein the preceding vehicle ahead of the own vehicle 2 has been detected by the external situation recognition unit 21, the target acceleration/deceleration speed characteristic setting unit 234 in the present embodiment sets the target acceleration/deceleration speed characteristic according to the distance between the preceding vehicle and the own vehicle 2 (the preceding vehicle distance) detected by a vehicle-to-vehicle distance detection unit 213 and an instruction (an instruction on the acceleration/deceleration speed level) issued by operating an operation unit, which is not illustrated.

Specifically, if the preceding vehicle distance detected by the vehicle-to-vehicle distance detection unit 213 is larger than the reference distance (or a distance within a predetermined range that includes the reference distance), then the target acceleration/deceleration speed characteristic setting unit 234 sets the target acceleration speed characteristic to the quick acceleration characteristic in the case where the driver has instructed to promptly accomplish acceleration/deceleration, or sets the target acceleration speed characteristic to the slow acceleration characteristic in the case where the driver has instructed to slowly accomplish acceleration/deceleration.

Further, if the preceding vehicle distance detected by the vehicle-to-vehicle distance detection unit 213 is smaller than the reference distance (or a distance within a predetermined range that includes the reference distance), then the target acceleration/deceleration speed characteristic setting unit 234 sets the target deceleration speed characteristic to the quick deceleration characteristic in the case where the driver has instructed to promptly accomplish acceleration/deceleration, or sets the target deceleration speed characteristic to the slow deceleration characteristic in the case where the driver has instructed to slowly accomplish acceleration/deceleration.

Alternatively, for example, a characteristic related to the acceleration/deceleration speed preferred by the driver (a frequently used characteristic) may be learned by the travel control apparatus 1 on the basis of the past history of the travel mode (e.g. the mode of a vehicle speed change or a steering change in response to a preceding vehicle distance) of the own vehicle 2 based on the steering by the driver in a state wherein the vehicle speed control is OFF. Further, in setting the target acceleration/deceleration speed characteristic, the quick speed characteristic or the slow speed characteristic preferred by the driver, which is learned as described above, may be used to automatically set the target acceleration/deceleration speed characteristic without using an instruction on the acceleration/deceleration speed issued by the driver.

Then, to determine the utility function fu, a utility function determination unit 242 in the present embodiment first determines, as the request-specific utility function $fu\_j$ corresponding to each request of the driver recognized by the driver request recognition unit 23, an acceleration/deceleration speed characteristic request utility function $fu\_4$ as the request-specific utility function corresponding to the target acceleration/deceleration speed characteristic in addition to the vehicle speed request utility function $fu\_1$, the inter-vehicular request utility function $fu\_2$, and the travel mode request utility function $fu\_3$, which have been described in the first embodiment.

These request-specific utility functions $fu\_1$, $fu\_2$, $fu\_3$, and $fu\_4$ correspond to the first sub utility function, the second sub utility function, the third sub utility function, and the fourth sub utility function, respectively, in the present invention.

Then, the utility function determination unit 242 combines the request-specific utility functions $fu\_1$, $fu\_2$, $fu\_3$, and $fu\_4$ thereby to determine the utility function fu. The combining method is the same as that described in the first embodiment.

The acceleration/deceleration speed characteristic request utility function $fu\_4$ is determined as described below.

In the case where a preceding vehicle ahead of the own vehicle 2 has been detected by the external situation recognition unit 21, the utility function determination unit 242 determines the acceleration/deceleration speed characteristic request utility function $fu\_4$ according to the target acceleration/deceleration speed characteristic set as described above by the target acceleration/deceleration speed characteristic setting unit 234 of the driver request recognition unit 23.

Specifically, the acceleration/deceleration speed characteristic request utility function $fu\_4$ is determined to be a function exhibiting the waveform illustrated in graph a1, a2, b1 or b2 of FIG. 9, corresponding to the case where the quick acceleration characteristic has been set, the case where the slow acceleration characteristic has been set, the case where the quick deceleration characteristic has been set, or the case where the slow deceleration characteristic has been set, respectively, as the currently set target acceleration/deceleration speed characteristic.

Both the acceleration/deceleration speed characteristic request utility function $fu\_4$ corresponding to the quick acceleration characteristic (hereinafter denoted by $fu\_4(a1)$) and $fu\_4$ corresponding to the slow acceleration characteristic (hereinafter denoted by $fu\_4(a2)$) are functions exhibiting convex waveforms in which the values of target accelerations at which the function values (utility index values) reach peak values are positive values.

In this case, the waveform of $fu\_4(a2)$ corresponding to the slow acceleration characteristic is set beforehand such that the value of a target acceleration at which the function value reaches a peak value or a value in the vicinity thereof falls within a range of a positive value that is slightly larger than zero.

Further, the waveform of $fu\_4(a1)$ corresponding to the quick acceleration characteristic is set beforehand such that the value of a target acceleration at which the function value reaches a peak value or a value in the vicinity thereof falls within a range of a positive value that is larger than $fu\_4(a2)$ corresponding to the slow acceleration characteristic.

Further, both $fu\_4$ corresponding to the quick deceleration characteristic (hereinafter denoted by $fu\_4(b1)$) and $fu\_4$ corresponding to the slow deceleration characteristic (hereinafter denoted by $fu\_4(b2)$) are functions exhibiting convex waveforms in which the values of target accelerations at which the function values (utility index values) reach peak values are negative values.

In this case, the waveform of $fu\_4(b2)$ corresponding to the slow deceleration characteristic is set beforehand such that the value of a target acceleration at which the function value reaches a peak value or a value in the vicinity thereof falls within a range of a negative value that is slightly smaller than zero.

Further, the waveform of $fu\_4(b1)$ corresponding to the quick deceleration characteristic is set beforehand such that the value of a target acceleration at which the function value reaches a peak value or a value in the vicinity thereof falls within a range of a negative value having a magnitude (the absolute value) which is larger than that of $fu\_4(b2)$ corresponding to the slow deceleration characteristic.

In the present embodiment, the acceleration/deceleration speed characteristic request utility function $fu\_4$ is set to a function having a function value of zero in the case where the external situation is a state in which no preceding vehicle exists ahead of the own vehicle 2, or in the case where the preceding vehicle distance is a distance that coincides with the reference distance or falls within a predetermined range that includes the reference distance (in the case where the distance is sufficiently close to the reference distance).

The present embodiment is the same as the first embodiment except for the aspects described above. According to the present embodiment described above, the utility function fu determined by the utility function determination unit 242 is a function, the function value of which increases as the effectiveness of the value of the target acceleration/deceleration in achieving maximum satisfaction of the target acceleration/deceleration speed characteristic in addition to the target vehicle speed, the target vehicle-to-vehicle distance and the target travel mode increases.

Thus, the utility function can be determined by reflecting also a driver request concerning the acceleration/deceleration speed of the own vehicle 2 when a preceding vehicle is present ahead of the own vehicle 2.

Accordingly, the present embodiment makes it possible to control the vehicle speed of the own vehicle 2 so as to achieve, in a well-balanced manner, both maximum satisfaction of more driver requests (the target vehicle speed, the target vehicle-to-vehicle distance, the target travel mode, and the target acceleration/deceleration speed characteristic) than in the first embodiment and the prevention of the travel of the own vehicle 2 from being inhibited by other vehicles.

Several modifications of the embodiments described above will now be described.

In the processing by the appropriateness function determination unit 243, the travel inhibition degree function fr and the utility function fu may be weighted according to the external situation around the own vehicle 2 and combined so as to obtain the appropriateness function fap.

For example, an arrangement may be made such that the external situation recognition unit 21 acquires the information on whether or not the surroundings of the own vehicle 2 include an intersection, the information on whether or not the surroundings of the own vehicle 2 are a nighttime environment, the information on whether or not the surroundings of the own vehicle 2 are a rush hour time environment, the information on whether or not the surroundings of the own vehicle 2 are a rainfall environment, and the information on whether or not the surroundings of the own vehicle 2 are a snowfall environment.

In this case, the information on whether or not the surroundings of the own vehicle 2 include an intersection can be acquired from, for example, navigation information, communication information from outside, or a pickup image of the camera 12.

Further, the information on whether or not the surroundings of the own vehicle 2 are a nighttime environment can be acquired from, for example, the information on time, the information on the ON/OFF of the headlights of the own vehicle 2, an output of a brightness sensor, or a pickup image of the camera 12.

Further, the information on whether or not the surroundings of the own vehicle 2 are a rush hour time environment can be acquired from, for example, the information on time.

Further, the information on whether or not the surroundings of the own vehicle 2 are a rainfall environment or a snowfall environment can be acquired from the information on the operation of the wipers of the own vehicle 2, an output of a raindrop sensor, communication information from outside (weather forecast) or the like.

If the surroundings of the own vehicle 2 include an intersection, or if the surroundings of the own vehicle 2 are a nighttime environment, or if the surroundings of the own vehicle 2 are a rush hour time environment, or if the surroundings of the own vehicle 2 are a rainfall environment, or if the surroundings of the own vehicle 2 are a snowfall environment, then the likelihood of the contact between the own vehicle 2 and an external object usually tends to be higher than in a normal case. This leads to a high need for preventing the travel of the own vehicle 2 from being inhibited.

In the case described above, therefore, the processing by the appropriateness function determination unit 243 combines fu and fr such that the appropriateness function fap depends more heavily on the travel inhibition degree function fr than on the utility function fu, as compared with a normal case.

In this case, the appropriateness function determination unit 243, for example, corrects the function value of the travel inhibition degree function fr determined as described above by the travel inhibition degree function determination unit 241 thereby to determine a travel inhibition degree function fr' corrected such that the function value corresponding to each value of the target acceleration/deceleration (the manipulated variable for control) becomes larger. Then, this fr' is used in place of fr in expression (3) to determine the appropriate function fap.

Thus, in a situation in which there is a high need for preventing the travel of the own vehicle 2 from being inhibited, the appropriateness function fap can be determined such that the appropriateness function fap depends more heavily on the travel inhibition degree function fr than on the utility function fu.

As a result, the vehicle speed of the own vehicle 2 can be controlled so as to enhance the reliability of preventing the travel of the own vehicle 2 from being inhibited.

Further, the vehicle 2 in the embodiments described above is the vehicle 2 capable of setting the target vehicle speed, the target vehicle-to-vehicle distance, and the target travel mode (the first embodiment) or the vehicle 2 capable of setting the target vehicle speed, the target vehicle-to-vehicle distance, the target travel mode, and the target acceleration/deceleration speed characteristic (the second embodiment). Alternatively, however, the vehicle 2 may be a vehicle that is capable of setting the target of only one of the target vehicle speed and the target vehicle-to-vehicle distance, or two targets, namely, one of the target vehicle speed and the target vehicle-to-vehicle distance and one of the target travel mode and a target acceleration/deceleration speed characteristic, or three targets, namely, one of the target vehicle speed and the target vehicle-to-vehicle distance and both the target travel mode and the target acceleration/deceleration speed characteristic.

If the target of only one of the target vehicle speed and the target vehicle-to-vehicle distance can be set, then the vehicle speed request utility function fu_1 or the inter-vehicular request utility function fu_2 may be determined as the utility function fu in the processing by the utility function determination unit 242.

Further, if two targets, namely, one of the target vehicle speed and the target vehicle-to-vehicle distance and one of the target travel mode and the target acceleration/deceleration speed characteristic can be set, then the vehicle speed request utility function fu_1 or the inter-vehicular request utility function fu_2 and the travel mode request utility function fu_3 or the acceleration/deceleration speed characteristic request utility function fu_4 may be combined, and the combination result may be determined as the utility function fu in the processing by the utility function determination unit 242.

Further, if three targets, namely, one of the target vehicle speed and the target vehicle-to-vehicle distance and both of the target travel mode and the target acceleration/deceleration speed characteristic can be set, then the vehicle speed request utility function fu_1 or the inter-vehicular request utility function fu_2, and the travel mode request utility function fu_3 and the acceleration/deceleration speed characteristic request utility function fu_4 may be combined, and the combination result may be determined as the utility function fu in the processing by the utility function determination unit 242.

Further, in the second embodiment, the target acceleration/deceleration speed characteristic has been set only in the situation in which a preceding vehicle exists ahead of the own vehicle 2; however, the target acceleration/deceleration speed characteristic may be set in a different situation.

The invention claimed is:

1. A vehicle travel control apparatus having a vehicle speed control unit which controls a vehicle speed of an own vehicle based on a target vehicle speed of the own vehicle set beforehand, comprising:
   a vehicle speed detection unit which detects an actual vehicle speed of the own vehicle;
   an external situation recognition unit which recognizes an external situation in the surroundings of the own vehicle;
   a utility function determination unit which determines a particular utility function from a plurality of utility functions based on the target vehicle speed and the detected vehicle speed, wherein each of the utility functions represents a predetermined functional relationship between a manipulated variable for vehicle speed control, which is a manipulated variable for controlling the vehicle speed of the own vehicle, and a utility index value, which is an index value representing an effectiveness degree of controlling the vehicle speed of the own vehicle according to each value of the manipulated variable for vehicle speed control;
   a travel inhibition degree function determination unit which determines a particular travel inhibition degree function from a plurality of travel inhibition degree functions based on the recognized external situation, wherein each of the travel inhibition degree functions represents a predetermined functional relationship between the manipulated variable for vehicle speed control and a travel inhibition degree index value, which is an index value representing an inhibition degree of the travel of the own vehicle estimated in a case where the vehicle speed of the own vehicle is controlled according to each value of the manipulated variable for vehicle speed control; and
   an appropriateness function determination unit which determines a particular appropriateness function by combining the particular utility function and the particular travel inhibition degree function, wherein the particular appropriateness function represents a relationship between the manipulated variable for vehicle speed control and an appropriateness of each value of the manipulated variable for vehicle speed control,
   wherein the vehicle speed control unit is configured to calculate the appropriateness of each value of the manipulated variable for vehicle speed control using the particular appropriateness function, and to control the vehicle speed of the own vehicle by manipulating a driving/braking force of the own vehicle according to the value of the manipulated variable for vehicle speed control corresponding to a highest calculated appropriateness.

2. The vehicle travel control apparatus according to claim 1,
   further comprising a vehicle-to-vehicle distance detection unit which detects a vehicle-to-vehicle distance between the own vehicle and a preceding vehicle in front thereof,
   wherein the vehicle speed control unit has a function of controlling the vehicle speed of the own vehicle based on the target vehicle speed and a target vehicle-to-vehicle distance, which is a target value of the vehicle-to-vehicle distance set beforehand, and
   the utility function determination unit is configured to determine the particular utility function by executing a first processing for determining a first sub utility function, which represents a relationship between the manipulated variable for vehicle speed control and the utility index value, according to the target vehicle speed and the detected vehicle speed of the own vehicle, and a second processing for determining a second sub utility function, which represents a relationship between the manipulated variable for vehicle speed control and the utility index value, according to the target vehicle-to-vehicle distance and the detected vehicle-to-vehicle distance, and by combining at least the first sub utility function and the second sub utility function.

3. The vehicle travel control apparatus according to claim 1,
   wherein the vehicle speed control unit has a function of controlling the vehicle speed of the own vehicle on the basis of two or more target parameters from among the target vehicle speed, a target travel mode variably determined beforehand to specify an acceleration operation pattern of the own vehicle, and a target acceleration/deceleration speed characteristic variably determined beforehand to specify a speed degree of acceleration or deceleration of the own vehicle in the case where the recognized external situation is a predetermined external situation, the two or more target parameters including at least the target vehicle speed,
   the utility function determination unit is configured to determine the particular utility function by executing two or more processings from among a first processing for determining a first sub utility function, which represents a relationship between the manipulated variable for vehicle speed control and the utility index value, according to the target vehicle speed and the detected vehicle speed of the own vehicle, a third processing for determining a third sub utility function, which represents a relationship between the manipulated variable for vehicle speed control and the utility index value, according to the target travel mode, and a fourth processing for determining a fourth sub utility function, which represents a relationship between the manipulated variable for vehicle speed control and the utility index value, according to the target acceleration/deceleration speed characteristic in the case where the recognized external situation is the predetermined external situation, the two or more processings including at least the first processing, and by combining two or more sub utility functions determined by the two or more processings from among the first sub utility function, the third sub utility function, and the fourth sub utility function.

4. The vehicle travel control apparatus according to claim 2,
   wherein the vehicle speed control unit has a function of controlling the vehicle speed of the own vehicle on the basis of three or more target parameters from among the target vehicle speed, the target vehicle-to-vehicle distance, the target travel mode variably determined beforehand to specify an acceleration operation pattern of the own vehicle, and a target acceleration/deceleration speed characteristic variably determined beforehand to specify a speed degree of acceleration or deceleration of the own vehicle in the case where the recognized external situation is a predetermined external situation, the three or more target parameters including at least the target vehicle speed and the target vehicle-to-vehicle distance, and the utility function determination unit is configured to determine the particular utility function by executing three or more processings from among a first processing for determining a first sub utility function, which represents a relationship between the manipulated variable for vehicle speed control and the utility index value, according to the target vehicle speed and the detected vehicle speed of the own vehicle, a second processing for determining a second sub utility function, which represents a relationship between the manipulated variable for vehicle speed control and the utility index value, according to the target vehicle-to-vehicle distance and the detected vehicle-to-vehicle distance, a third processing for determining a third sub utility function, which represents a relationship between the manipulated variable for vehicle speed control and the utility index value, according to the target travel mode, and a fourth processing for determining a fourth sub utility function, which represents a relationship between the manipulated variable for vehicle speed control and the utility index value, according to the target acceleration/deceleration speed characteristic in the case where the recognized external situation is the predetermined external situation, the three or more processings including at least the first processing and the second processing, and by combining three or more sub utility functions determined by the three or more processings from among the first sub utility function, the second sub utility function, the third sub utility function, and the fourth sub utility function.

5. A vehicle travel control apparatus having a vehicle speed control unit which controls a vehicle speed of an own vehicle on the basis of a target vehicle-to-vehicle distance between the own vehicle and a preceding vehicle in front thereof set beforehand, comprising:

a vehicle-to-vehicle distance detection unit which detects a vehicle-to-vehicle distance between the own vehicle and the preceding vehicle in front thereof;

an external situation recognition unit which recognizes an external situation in the surroundings of the own vehicle;

an utility function determination unit which determines a particular utility function from a plurality of utility functions based on the target vehicle speed and the detected vehicle speed, wherein each of the utility functions represents a predetermined functional relationship between a manipulated variable for vehicle speed control, which is a manipulated variable for controlling the vehicle speed of the own vehicle, and a utility index value, which is an index value representing an effectiveness degree of controlling the vehicle speed of the own vehicle according to each value of the manipulated variable for vehicle speed control;

a travel inhibition degree function determination unit which determines a particular travel inhibition degree function from a plurality of travel inhibition degree functions based on the recognized external situation, wherein each of the travel inhibition degree functions represents a predetermined functional relationship between the manipulated variable for vehicle speed control and a travel inhibition degree index value which is an index value representing an inhibition degree of the travel of the own vehicle expected in the case where the vehicle speed of the own vehicle is controlled according to each value of the manipulated variable for vehicle speed control; and an appropriateness function determination unit which determines a particular appropriateness function by combining the particular utility function and the particular travel inhibition degree function, wherein the particular appropriateness function represents a relationship between the manipulated variable for vehicle speed control and an appropriateness of each value of the manipulated variable for vehicle speed control;

wherein the vehicle speed control unit is configured to calculate the appropriateness of each value of the manipulated variable for vehicle speed control using the particular appropriateness function, and to control the vehicle speed of the own vehicle by manipulating a driving/braking force of the own vehicle according to the value of the manipulated variable for vehicle speed control corresponding to a highest calculated appropriateness.

6. The vehicle travel control apparatus according to claim 5, wherein the vehicle speed control unit has a function for controlling the vehicle speed of the own vehicle on the basis of two or more target parameters from among the target vehicle-to-vehicle distance, a target travel mode variably determined beforehand to specify an acceleration operation pattern of the own vehicle, and a target acceleration/deceleration speed characteristic variably determined beforehand to specify the speed level of the acceleration or the deceleration of the own vehicle in the case where the recognized external situation is a predetermined external situation, the two or more target parameters including at least the target vehicle-to-vehicle distance, and the utility function determination unit is configured to determine the particular utility function by executing two or more processings from among a second processing for determining a second sub utility function, which represents a relationship between the manipulated variable for vehicle speed control and the utility index value, according to the target vehicle-to-vehicle distance and the detected vehicle-to-vehicle distance, a third processing for determining a third sub utility function, which represents a relationship between the manipulated variable for vehicle speed control and the utility index value, according to the target travel mode, and a fourth processing for determining a fourth sub utility function, which represents a relationship between the manipulated variable for vehicle speed control and the utility index value, according to the target acceleration/deceleration speed characteristic in the case where the recognized external situation is the predetermined external situation, the two or more processings including at least the second processing, and by combining two or more sub utility functions determined by the two or more processings from among the second sub utility function, the third sub utility function and the fourth sub utility function.

7. The vehicle travel control apparatus according to claim 3, wherein the predetermined external situation includes at least a situation in which at least a preceding vehicle exists in front of the own vehicle.

8. The vehicle travel control apparatus according to claim 1,
wherein the external situation in the surroundings of the own vehicle recognized by the external situation recognition unit includes the state of existence of other vehicles in the surroundings of the own vehicle including at least a region in front of the own vehicle and a lateral region thereof, and
the travel inhibition degree function determination unit is configured to, in the case where the existence of an other vehicle in the surroundings of the own vehicle has been recognized by the external situation recognition unit, determine a probability of the other vehicle expected to be traveling in front of the own vehicle in the future and to determine the particular travel inhibition degree function such that the travel inhibition degree index value corresponding to each value of the manipulated variable for vehicle speed control becomes larger as the determined probability becomes higher.

9. The vehicle travel control apparatus according to claim 8,
wherein the travel inhibition degree function determination unit is configured to, in the case where the existence of a plurality of other vehicles in the surroundings of the own vehicle has been recognized by the external situation recognition unit, determine the probability and to determine a sub travel inhibition degree function, which represents a relationship between the manipulated variable for vehicle speed control and the travel inhibition degree index value attributable to the other vehicles, according to the probability for each of the other vehicles and to determine the particular travel inhibition degree function by combining the sub travel inhibition degree functions determined corresponding to each of a plurality of the other vehicles.

10. The vehicle travel control apparatus according to claim 9,
wherein the travel inhibition degree function determination unit is configured to determine, for each of the other vehicles, a reference sub travel inhibition degree function, which is the sub travel inhibition degree function in the case where it is assumed that the other vehicle will be traveling in front of the own vehicle in the future, and the probability, and to determine a function obtained by multiplying the reference sub travel inhibition degree function by the probability as the sub travel inhibition degree function.

11. The vehicle travel control apparatus according to claim 8,
wherein the travel inhibition degree function determination unit determines the probability on the basis of at least either one relative relationship of a relative relationship between the own vehicle and the other vehicle and a relative relationship between other vehicles.

12. The vehicle travel control apparatus according to claim 1,
wherein the external situation in the surroundings of the own vehicle recognized by the external situation recognition unit includes information related to at least any one of a congestion level, a visibility state, and a road surface state in the surroundings of the own vehicle, and the appropriateness function determination unit is configured to weight and combine the particular utility function and the particular travel inhibition degree function such that the dependence of particular the appropriateness function on the particular utility function and the dependence of the particular appropriateness function on the particular travel inhibition degree function are different according to the information related to the congestion level or the visibility state or the road surface state in the surroundings of the own vehicle.

13. The vehicle travel control apparatus according to claim 1,
wherein the external situation in the surroundings of the own vehicle recognized by the external situation recognition unit includes information indicating whether or not the surroundings of the own vehicle includes an intersection, and
the appropriateness function determination unit is configured to weight and combine the particular utility function and the particular travel inhibition degree function such that the dependence of the particular appropriateness function on the particular utility function becomes relatively low and the dependence of the particular appropriateness function on the particular travel inhibition degree function becomes relatively high in the case where the surroundings of the own vehicle include the intersection.

14. The vehicle travel control apparatus according to claim 1,
wherein the external situation in the surroundings of the own vehicle recognized by the external situation recognition unit includes information indicating whether or not the surroundings of the own vehicle are a nighttime environment or a rush hour time environment, and
the appropriateness function determination unit is configured to weight and combine the particular utility function and the particular travel inhibition degree function such that the dependence of the particular appropriateness function on the particular utility function becomes relatively low, and the dependence of the particular appropriateness function on the particular travel inhibition degree function becomes relatively high in the case where the surroundings of the own vehicle are the nighttime environment or the rush hour time environment.

15. The vehicle travel control apparatus according to claim 1,
wherein the external situation in the surroundings of the own vehicle recognized by the external situation recognition unit includes information indicating whether or not the surroundings of the own vehicle are a rainfall environment or a snowfall environment, and
the appropriateness function determination unit is configured to weight and combine the particular utility function and the particular travel inhibition degree function such that the dependence of the particular appropriateness function on the particular utility function becomes relatively low, and the dependence of the particular appropriateness function on the particular travel inhibition degree function becomes relatively high in the case where the surroundings of the own vehicle are the rainfall environment or the snowfall environment.

16. The vehicle travel control apparatus according to claim 5,
wherein the external situation in the surroundings of the own vehicle recognized by the external situation recognition unit includes the state of existence of other vehicles in the surroundings of the own vehicle including at least a region in front of the own vehicle and a lateral region thereof, and the travel inhibition degree function determination unit is configured to, in the case where the existence of an other vehicle in the surroundings of the own vehicle has been recognized by the external situation recognition unit, determine a probability of the other vehicle expected to be traveling in front of the own vehicle in the future and to determine the particular travel inhibition degree function such that the travel inhibition degree index value corresponding to each value of the manipulated variable for vehicle speed control becomes larger as the determined probability becomes higher.

17. The vehicle travel control apparatus according to claim 5, wherein the external situation in the surroundings of the own vehicle recognized by the external situation recognition unit includes information related to at least any one of a congestion level, a visibility state, and a road surface state in the surroundings of the own vehicle, and the appropriateness function determination unit is configured to weight and combine the particular utility function and the particular travel inhibition degree function such that the dependence of the particular appropriateness function on the particular utility function and the dependence of the particular appropriateness function on the particular travel inhibition degree function are different according to the information related to the congestion level or the visibility state or the road surface state in the surroundings of the own vehicle.

18. The vehicle travel control apparatus according to claim 5, wherein the external situation in the surroundings of the own vehicle recognized by the external situation recognition unit includes information indicating whether or not the surroundings of the own vehicle includes an intersection, and the appropriateness function determination unit is configured to weight and combine the particular utility function and the particular travel inhibition degree function such that the dependence of the particular appropriateness function on the particular utility function becomes relatively low and the dependence of the particular appropriateness function on the particular travel inhibition degree function becomes relatively high in the case where the surroundings of the own vehicle include the intersection.

19. The vehicle travel control apparatus according to claim 5, wherein the external situation in the surroundings of the own vehicle recognized by the external situation recognition unit includes information indicating whether or not the surroundings of the own vehicle are a nighttime environment or a rush hour time environment, and the appropriateness function determination unit is configured to weight and combine the particular utility function and the particular travel inhibition degree function such that the dependence of the particular appropriateness function on the particular utility function becomes relatively low, and the dependence of the particular appropriateness function on the particular travel inhibition degree function becomes relatively high in the case where the surroundings of the own vehicle are the nighttime environment or the rush hour time environment.

20. The vehicle travel control apparatus according to claim 5, wherein the external situation in the surroundings of the own vehicle recognized by the external situation recognition unit includes information indicating whether or not the surroundings of the own vehicle are a rainfall environment or a snowfall environment, and the appropriateness function determination unit is configured to weight and combine the particular utility function and the particular travel inhibition degree function such that the dependence of the particular appropriateness function on the particular utility function becomes relatively low, and the dependence of the particular appropriateness function on the particular travel inhibition degree function becomes relatively high in the case where the surroundings of the own vehicle are the rainfall environment or the snowfall environment.

21. The vehicle travel control apparatus according to claim 4, wherein the predetermined external situation includes at least a situation in which at least a preceding vehicle exists in front of the own vehicle.

22. The vehicle travel control apparatus according to claim 6, wherein the predetermined external situation includes at least a situation in which at least a preceding vehicle exists in front of the own vehicle.

* * * * *